(12) United States Patent
Suzuki et al.

(10) Patent No.: US 6,556,910 B2
(45) Date of Patent: Apr. 29, 2003

(54) CONTROL APPARATUS AND METHOD FOR VEHICLE HAVING AN IDLE STOP FUNCTION

(75) Inventors: Takehiko Suzuki, Anjo (JP); Satoru Wakuta, Anjo (JP); Takeshi Inuzuka, Anjo (JP); Takayuki Kubo, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/228,220

(22) Filed: Aug. 27, 2002

(65) Prior Publication Data

US 2003/0045988 A1 Mar. 6, 2003

(30) Foreign Application Priority Data

| Aug. 31, 2001 | (JP) | ........................... 2001-265152 |
| Aug. 31, 2001 | (JP) | ........................... 2001-265153 |
| Aug. 31, 2001 | (JP) | ........................... 2001-265154 |

(51) Int. Cl.$^7$ ............................................... G06F 19/00
(52) U.S. Cl. .................. 701/54; 701/67; 477/8
(58) Field of Search ........................ 701/54, 51, 58, 701/60, 67, 68; 192/3.51, 3.63; 477/5, 6, 8

(56) References Cited

U.S. PATENT DOCUMENTS

| 4,953,091 A | * | 8/1990 | Baltusis et al. ............ 192/3.51 |
| 5,151,858 A | * | 9/1992 | Milunas et al. ............... 701/54 |
| 6,125,565 A | * | 10/2000 | Hillstrom ..................... 701/51 |

FOREIGN PATENT DOCUMENTS

JP  A 2000-264096  9/2000

* cited by examiner

Primary Examiner—Richard M. Camby
(74) Attorney, Agent, or Firm—Oliff & Berridge, PLC

(57) ABSTRACT

A control apparatus for a vehicle which executes an automatic stop control of an engine on the basis of a stop condition, and executes a restart control of the engine on the basis of a start condition. The vehicle includes an engagement element which freely interrupts and establishes power transmission between an output of the engine and a drive wheel, a hydraulic servo which freely operates an engagement state of the engagement element and a control unit which executes a feedback control for bringing a hydraulic pressure of the hydraulic servo into a state immediately before the frictional engagement element is engaged, on the basis of the engagement state of the engagement element wherein the control unit starts the feedback control after the hydraulic pressure of the hydraulic servo is controlled to a predetermined hydraulic pressure when the restart control of the engine is executed.

48 Claims, 18 Drawing Sheets

|  | C1 | C2 | C3 | B1 | B2 | B3 | B4 | B5 | F1 | F2 |
|---|---|---|---|---|---|---|---|---|---|---|
| N |  |  |  |  |  |  |  | ○ |  |  |
| 1ST | ○ |  |  |  |  | △ |  | ○ |  | ○ |
| 2ND | ○ |  |  | △ | ○ |  |  | ○ | ○ |  |
| 3RD | ○ |  |  | △ | ○ |  | ○ |  | ○ |  |
| 4TH | ○ |  | ○ | △ | ○ |  |  |  | ○ |  |
| 5TH | ○ | ○ | ○ |  |  |  |  |  |  |  |
| REV |  | ○ |  |  |  | ○ |  | ○ |  |  |

FIG. 3(b)

CONTROL APPARATUS AND METHOD FOR VEHICLE HAVING AN IDLE STOP FUNCTION

BACKGROUND OF THE INVENTION

1. Field of Invention

The invention relates to a control apparatus for a vehicle having an idle stop function, and more particularly to a control apparatus which is suitably used in a hybrid vehicle having a motor (including a generator function) attached to an automatic transmission.

2. Description of Related Art

Conventionally, there have been suggested many vehicles having a so-called idle stop function, that is, a function of automatically stopping an engine for the purpose of saving fuel, reducing exhaust emission, reducing noise and the like when a vehicle stops during traveling and a predetermined stop condition is satisfied. In particular, in Japanese Unexamined Patent Publication No. 2000-264096, there is proposed a control apparatus at a time of restarting the engine, which prevents a driver from having an uncomfortable feeling due to a shock, a vibration and the like caused by an engagement of a forward clutch, in the case that the driver does not have an intention of starting the vehicle, for example, when a charged amount of the battery is insufficient or when a compressor of an air conditioner is operated due to an increase of a room temperature.

This control apparatus is constructed so as to automatically stop the engine at a time when a predetermined stop condition such as an accelerator off, a brake on or the like is satisfied even in the case that a shift position is at a drive position such as a D range or the like, in the vehicle provided with the automatic transmission having the forward clutch. The control apparatus is also constructed so as to restart the automatically stopped engine when a predetermined restart condition such as an accelerator on or the like is satisfied, and execute the restart in a state where the forward clutch is disengaged.

SUMMARY OF THE INVENTION

In the control apparatus at a time of restarting the engine, in the case of detecting the driver's intention of starting the vehicle such as the accelerator on or the like, even when the engine is rotated on the basis of the requirement of charging the battery or the like, a hydraulic pressure of the automatic transmission is generated and a line pressure is directly supplied to a hydraulic servo of the forward clutch according to a rapid pressure increasing control. The hydraulic pressure of the hydraulic servo thus starts to increase in the disengaged state so that a delay in engagement of the forward clutch is caused. Therefore, there is a possibility that the driver may have an uncomfortable feeling. Further, a changeover valve is opened on the basis of the rapid pressure increase control command and quickly supplies the line pressure to the hydraulic servo for the forward clutch so as to slowly increase the hydraulic pressure to thereby smoothly engaging the forward clutch. However, control of a timing or the like of the changeover valve is complicated and troublesome.

Accordingly, the invention thus provides a control apparatus for a vehicle which executes a feedback control for bringing a hydraulic pressure of a hydraulic servo to a state immediately before a frictional engagement element is engaged when a restart control of an engine is executed and the hydraulic pressure of the hydraulic servo is controlled to a predetermined hydraulic pressure, thereby solving the problems mentioned above.

In accordance with an exemplary aspect of the invention, there is provided a control apparatus for a vehicle which executes an automatic stop control of an engine on the basis of a stop condition, and executes a restart control of the engine on the basis of a start condition, including an engagement element which freely interrupts and establishes power transmission between an output of the engine and a drive wheel, a hydraulic servo which freely operates an engagement state of the engagement element and a control unit which executes a feedback control for bringing a hydraulic pressure of the hydraulic servo into a state immediately before the frictional engagement element is engaged, on the basis of the engagement state of the engagement element wherein the control unit starts the feedback control after the hydraulic pressure of the hydraulic servo is controlled to a predetermined hydraulic pressure when the restart control of the engine is executed.

Therefore, since the control unit starts the feedback control of the hydraulic pressure of the hydraulic servo so that the engagement element is brought into the state immediately before engagement, on the basis of the engagement state of the frictional engagement element, after the hydraulic pressure of the hydraulic servo is controlled to the predetermined hydraulic pressure when the restart control of the engine is executed, it is possible to prevent a delay in the engagement of the engagement element, for example, when the start request from the driver exists, while it is possible to respond to a change in time lapse.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIGS. 3A and 3B are views showing an automatic transmission applied to the invention, in which FIG. 3A is a skeleton view of an automatic transmission mechanism, and FIG. 3B is a table of operation thereof;

DETAILED DESCRIPTION OF PREFERRED EMBODIMENTS

Figure 2:
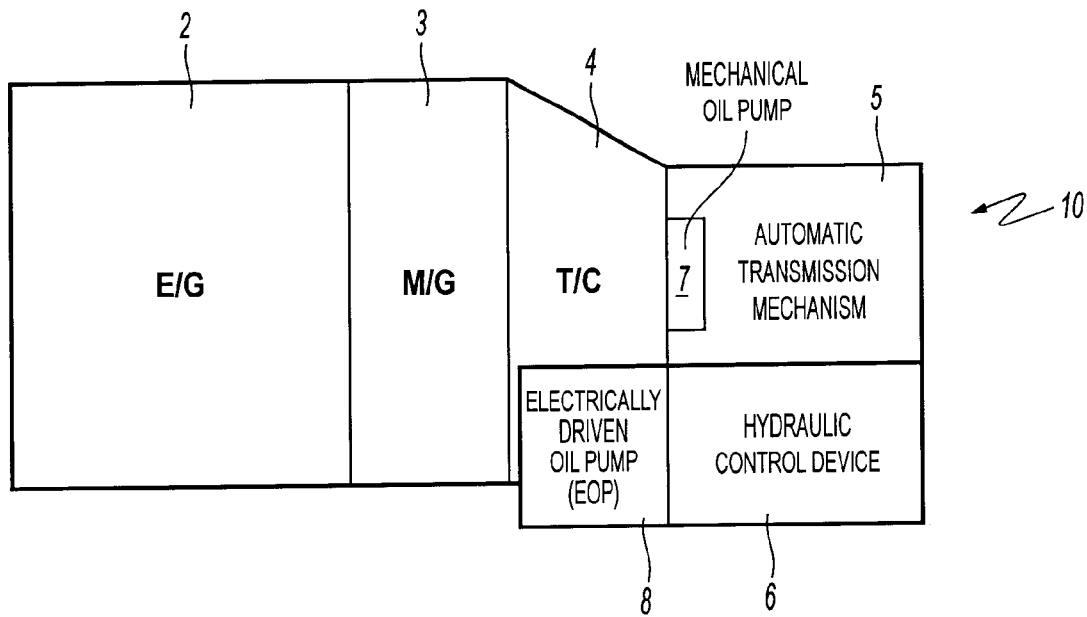
FIG. 2 is a block diagram showing a drive system of the vehicle in accordance with the invention.
Figure 3A:
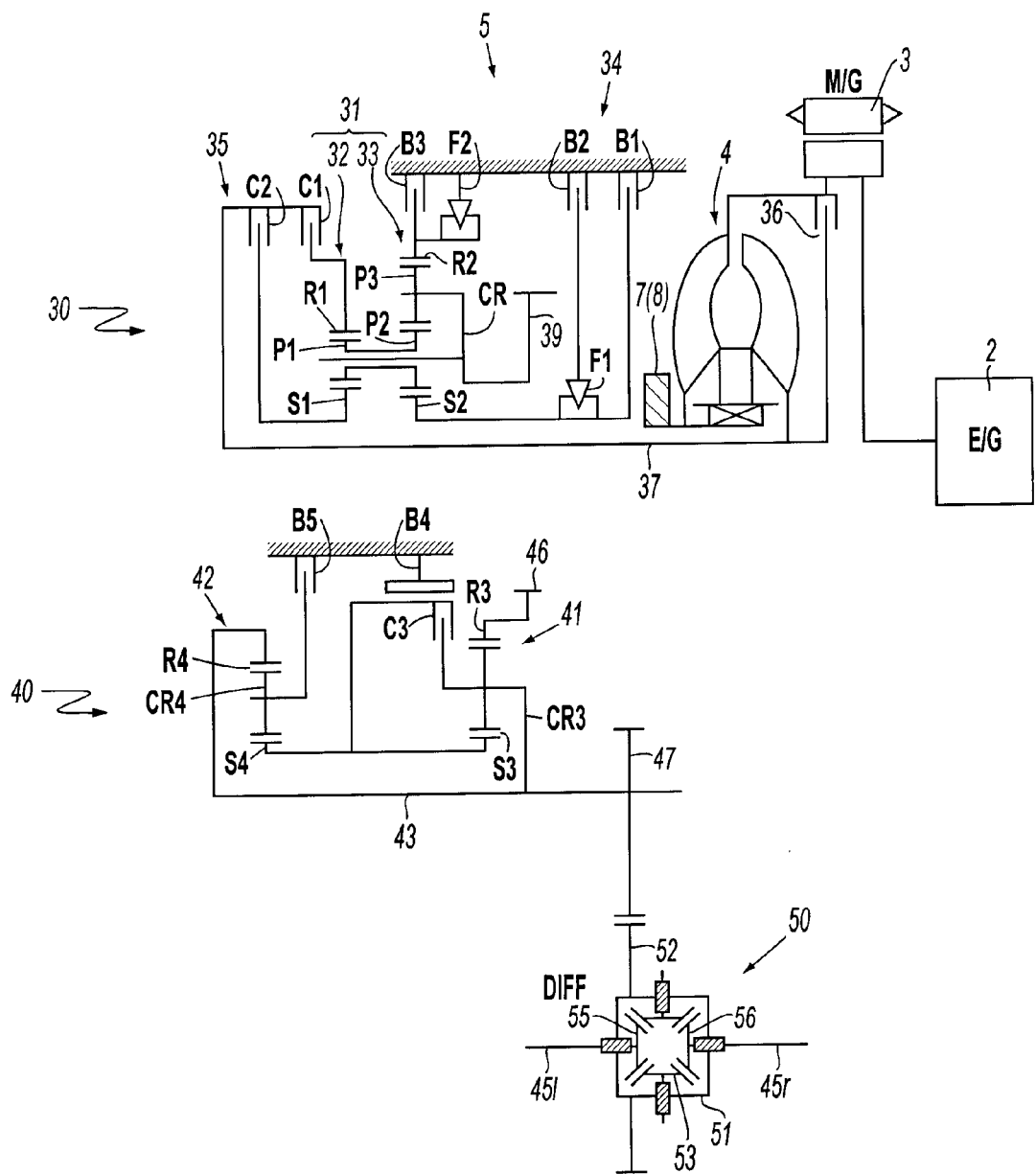

Hereinafter, an embodiment of the invention will be described with reference to the accompanying drawings. First of all, a description will be given of a drive system for a vehicle to which a control apparatus for a vehicle in accordance with the invention can be applied, and an automatic transmission mechanism provided therein, with reference to FIGS. 2 and 3. FIG. 2 is a block diagram showing a drive system of the vehicle in accordance with an embodiment of the invention, and FIGS. 3A and 3B are views showing an automatic transmission mechanism 5 applied to the invention, in which FIG. 3A is a skeleton view of the automatic transmission mechanism 5, and FIG. 3B is a table of operation thereof.

As shown in FIG. 2, a drive source is constituted by an engine 2 and a motor generator (M/G) 3, and a driving force thereof is output to an automatic transmission 10. The automatic transmission 10 is constituted by a torque converter (T/M) 4 as one example of a fluid transmission device, an automatic transmission mechanism 5, a hydraulic control device 6, a mechanical oil pump 7 and an electrically driven oil pump 8. The automatic transmission mechanism 5 changes an input driving force on the basis of a predetermined vehicle traveling condition, and outputs the driving force to wheels and the like. Further, a plurality of frictional engagement elements for executing a shift are arranged in the automatic transmission mechanism 5, and there is provided a hydraulic control device 6 for hydraulically controlling an engagement of the frictional engagement elements so as to execute a shift and controlling the torque converter 4. Further, a mechanical oil pump 7 and an electrically driven oil pump for supplying a hydraulic pressure to the hydraulic control device 6 are arranged. The mechanical oil pump 7 is arranged so as to be operated in accordance with the torque converter 4, and is driven by the driving force of the engine 2 and the motor generator 3. Further, the electrically driven oil pump 8 is independent from the driving force of the engine 2 and the motor generator 3, and is driven by a motor to which an electric power is supplied from a battery (not shown).

Next, a description will be given of the automatic transmission mechanism 5. As shown in FIG. 3A, a main automatic transmission mechanism 30 is arranged on a first shaft (hereinafter, refer to an "input shaft") 37 which is arranged in an engine output shaft in line, and the driving force is transmitted to the input shaft 37 from the engine 2 (E/G) and the motor generator (M/G) 3 via the torque converter 4 having a lockup clutch 36. The mechanical oil pump 7 and the electrically driven oil pump 8 which are adjacent to the torque converter 4, a brake portion 34, a planetary gear unit portion 31 and a clutch portion 35 are arranged in the input shaft 37 in order.

The planetary gear unit portion 31 is constituted by a simple planetary gear 32 and a double pinion planetary gear 33. The simple planetary gear 32 is constituted by a sun gear S1, a ring gear R1, and a carrier CR which supports a pinion P1 engaged with these gears, and the double pinion planetary gear 33 is constituted by a sun gear S2, a ring gear R2, and the carrier CR which supports a pinion P2 engaged with the sun gear S1 and a pinion P3 engaged with the ring gear R2 so that the pinions P2 and P3 are engaged with each other. Further, the sun gear S1 and the sun gear S2 are rotatably supported to a hollow shaft which is rotatably supported to the input shaft 37, respectively. Further, the carrier CR is commonly used in both of the planetary gears 32 and 33, and the pinion P1 and the pinion P2 which are respectively engaged with the sun gears S1 and S2 are connected so as to integrally rotate.

The brake portion 34 is constructed such that a one-way clutch F1, a brake B1 and a brake B2 are sequentially arranged from the radially inside toward the radially outside, and a counter drive gear 39 is connected to the carrier CR via a spline. Further, a one-way clutch F2 is interposed in the ring gear R2, and a brake B3 is interposed between an outer periphery of the ring gear R2 and a case. Further, the clutch portion 35 is provided with a forward clutch (hereinafter, refer simply to a "clutch") C1 corresponding to an input clutch (a frictional engagement element) and a direct clutch C2, the clutch C1 is interposed in an outer periphery of the ring gear R1, and the direct clutch C2 is interposed between an inner periphery of a movable member (not shown) and a flange portion connected to a leading end of the hollow shaft.

A sub transmission mechanism 40 is arranged in a second shaft 43 which is arranged in parallel with the input shaft 37, and the input shaft 37 and the second shaft 43 are constructed in a triangular shape in a side view together with a third shaft constituted by differential shafts (left and right axles) 45l and 45r. Then, the sub transmission mechanism 40 has simple planetary gears 41 and 42, a carrier CR3 and a ring gear R4 are integrally connected, and sun gears S3 and S4 are integrally connected to each other, whereby a Simpson type gear train is constructed. Further, the ring gear R3 is connected to a counter driven gear 46 so as to constitute an input portion, and the carrier CR3 and the ring gear R4 are connected to a speed reduction gear 47 corresponding to an output portion. Further, a UD direct clutch C3 is interposed between the ring gear R3 and the integral sun gears S3 and S4, the integral sun gear S3 (S4) can be properly engaged by a brake B4, and the carrier CR4 can be properly engaged by a brake B5. Accordingly, the sub transmission mechanism 40 can obtain a transmission speed range having three forward speeds.

Further, a differential unit 50 constituting the third shaft has a differential case 51, and a gear 52 engaged with the speed reduction gear 47 is fixed to the case 51. Further, a differential gear 53 and left and right side gears 55 and 56 are engaged with each other and are rotatably supported in an inner portion of the differential case 51, and the left and right axles 45l and 45r are extended from the left and right side gears. Accordingly, a rotation output from the gear 52 is branched in correspondence to a load torque, and is transmitted to left and right front wheels via the left and right axles 45l and 45r.

A hydraulic servo (not shown) which is driven and controlled in accordance with a supply of a hydraulic pressure controlled by the hydraulic control device 6 mentioned above is provided in each of the clutches C1 and C2, and the brakes B1, B2, B3, B4 and B5 mentioned above. The hydraulic servos have pistons for pressing a plurality of inner friction plates and outer friction plates which are arranged in the clutches and the brakes with gaps, and freely operate engagement states of the clutches and the brakes. In this case, in the following description, a state immediately before the clutch C1 is engaged in a state in which the gaps interposed between the respective inner friction plates and outer friction plates is closed up, and the clutch C1 is not engaged.

Next, a description will be given of an operation of the automatic transmission mechanism 5 with reference to a table of operation shown in FIG. 3B. In a first speed (1ST) state, the clutch C1, the one-way clutch F2 and the brake B5 are engaged. Accordingly, the main transmission mechanism 30 is brought into a first speed state, and the rotation at the reduced speed is transmitted to the ring gear R3 in the sub transmission mechanism 40 via the counter gears 39 and 46. Since the carrier CR4 is stopped by the brake B5, the sub transmission mechanism 40 is in the first speed state. The speed of the rotation of the main transmission mechanism 30 is further reduced by the sub transmission mechanism 40, and is transmitted to the axles 45l and 45r via the gears 47 and 52 and the differential unit 50.

In a second speed (2ND) state, the brake B2 is engaged in addition to the clutch C1, the one-way clutch F2 is smoothly switched to the one-way clutch F1, and the main transmission mechanism 30 is brought into a second speed state. Further, the sub transmission mechanism 40 is in the first speed state due to the engagement of the brake B5, and the entire automatic transmission mechanism 5 can achieve the second speed based on a combination of the second speed state with the first speed state.

In a third speed (3RD) state, the main transmission mechanism 30 is in the same state as the second speed state mentioned above in which the clutch C1, the brake B2 and the one-way clutch F1 are engaged, and the sub transmission mechanism 40 engages the brake B4. Then, the sun gears S3 and S4 are fixed, and the rotation output from the ring gear R3 is output as the second speed rotation from the carrier CR3, so that the entire automatic transmission mechanism 5a can achieve the third speed based on a combination of the second speed state of the main transmission mechanism 30 with the second speed state of the sub transmission mechanism 40.

In a fourth speed (4TH) state, the main transmission mechanism 30 is in the same state as the second speed and third speed states in which the clutch C1, the brake B2 and the one-way clutch F1 are engaged, and the sub transmission mechanism 40 disengages the brake B4 and engages the UD direct clutch C3. In this state, the ring gear R3 and the sun gear S3 (S4) are connected, and both of the planetary gears 41 and 42 are directly coupled and so as to be integrally rotated. Accordingly, the second speed state of the main transmission mechanism 30 and the direct-coupled state (the third speed state) of the sub transmission mechanism 40 are combined, whereby the entire automatic transmission mechanism 5 can achieve the fourth speed.

In a fifth speed (5TH) state, the clutch C1 and the direct clutch C2 are engaged, the rotation of the input shaft 37 is transmitted to both of the ring gear R1 and the sun gear S1, and the main transmission mechanism 30 is brought into the direct-coupled rotation state in which the gear unit 31 integrally rotates. Further, the sub transmission mechanism 40 is in the direct-coupled rotation state in which the UD direct clutch C3 is engaged. Accordingly, the third speed state (the direct-coupled state) of the main transmission mechanism 30 and the third speed state (the direct-coupled state) of the sub transmission mechanism 40 are combined, whereby the entire automatic transmission 5 can achieve the fifth speed rotation.

In a reverse movement (REV) state, the direct clutch C2 and the brake B3 are engaged, and the brake B5 is engaged. In this state, in the main transmission mechanism 30, a reverse rotation is taken out, and in the sub transmission mechanism 40, the carrier CR4 is stopped also in a reverse rotation direction on the basis of the brake B5, and is kept in the first speed state. Accordingly, the reverse rotation of the main transmission mechanism 30 and the first speed rotation of the sub transmission mechanism 40 are combined, whereby a reverse rotation at the reduced speed can be achieved.

In this case, in FIG. 3B, a triangle mark denotes an operation at a time of an engine brake. That is, in the first speed, the brake B3 is engaged so as to fix the ring gear R2 in place of the one-way clutch F2. In the second speed, the third speed and the fourth speed, the brake B1 is engaged so as to fix the sun gear S2 instead of the one-way clutch F1.

Figure 1:
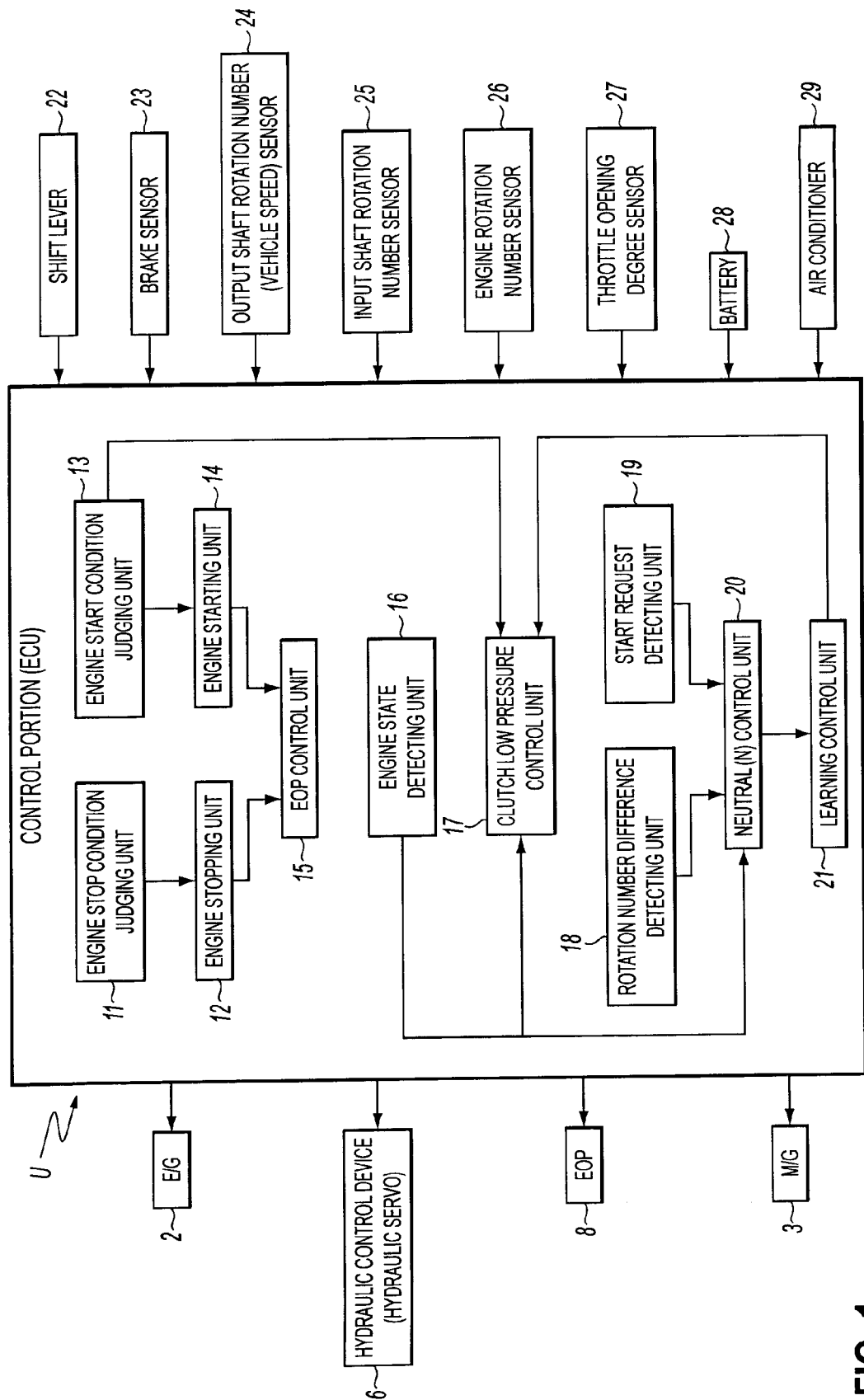
FIG. 1 is a block diagram showing a control apparatus for a vehicle in accordance with an embodiment of the invention.

Next, a description will be given of the control apparatus for a vehicle in accordance with an embodiment of the invention with reference to FIG. 1. FIG. 1 is a block diagram showing the control apparatus for a vehicle in accordance with the embodiment of the invention. As shown in FIG. 1, the control apparatus for a vehicle is provided with a control portion (ECU) U, and the control portion U is connected to the engine (E/G) 2, the hydraulic control device 6, the electrically driven oil pump (EOP) 8, and the motor generator (M/G) 3 (refer to FIG. 2) mentioned above. Further, a shift lever 22, for example, arranged in a driver's seat, a brake sensor 23 provided in a brake pedal (and a side brake), an output shaft rotation sensor 24 provided on the axles 45l and 45r corresponding to the output shaft of the automatic transmission 10, an input shaft rotation sensor 25 provided on the input shaft 37, an engine rotation number sensor 26 provided on the engine 2, and a throttle opening degree sensor 27 are connected to the control portion U. In addition, a battery 28, a (room) air conditioner 29 and the like are connected thereto.

An engine stop condition judging unit 11, an engine stopping unit 12, an engine start condition judging unit 13, an engine starting unit 14, an electrically driven oil pump (EOP) control unit 15, an engine state detecting unit 16, a clutch low pressure control unit 17, a rotation number difference detecting unit 18, a start request detecting unit 19, a neutral (N) control unit 20 and a learning control unit 21 are provided in the control portion U.

For example, in the case that the vehicle speed sensor 24 detects that the vehicle is in the stop state, the brake sensor 23 detects that the brake is in an ON state, the throttle opening degree sensor 27 detects that a throttle opening degree is 0%, and the engine rotation number sensor 26 detects that an engine rotation number Ne is near an idle rotation number. Further, when conditions are such that the remaining amount of the battery is sufficient, that the air conditioner is not operated and the like are satisfied, the engine stop condition judging unit 11 judges that a stop condition of the engine 2 is satisfied. Then, the engine stopping unit 12 stops the engine 2 on the basis of the judgement. Further, since the mechanical oil pump 7 stops in accordance with the engine 2 in the manner mentioned above, the EOP control unit 15 drives and controls the electrically driven oil pump 8 so as to supply the hydraulic pressure to the hydraulic control device 6.

When the engine start condition other than the start request is satisfied, that is, when the remaining amount of the battery becomes insufficient or when the air conditioner is operated and a compressor (not shown) interlocked with the engine 2 is driven in the state in which the engine 2 is stopped, the engine start condition judging unit 13 judges that the condition for starting the engine 2 is satisfied. Then, the engine starting unit 14 starts the engine 2 on the basis of the judgement. Further, since the mechanical oil pump 7 is driven according to the engine 2 so as to supply the hydraulic pressure to the hydraulic control device 6, the EOP control unit 15 stops and controls the electrically driven oil pump 7.

If it is judged that the condition for starting the engine 2 is satisfied by the engine start condition judging unit 13 in a state in which the engine 2 is stopped by the engine stopping unit 12 during the stop of the vehicle, the clutch low pressure control unit 17 controls the hydraulic pressure PC1 of the clutch C1 (refer to FIG. 3) which executes the engagement between the rotation of the input shaft 37 to which the output of the engine 2 is input and the automatic transmission 5 to a low pressure (details will be described later). Further, at this time, since it is necessary to reduce the hydraulic pressure PC1 of the clutch C1 to the low pressure by the clutch low pressure control unit 17 before the engine 2 is started, the engine starting unit 14 starts the engine 2 after a predetermined time Ta.

If it is detected by the engine starting unit 14 that the start of the engine 2 is completed, in a state where the hydraulic pressure PC1 of the clutch C1 is controlled to the low pressure by the clutch low pressure control unit 17, the engine state detecting unit 16 finishes the low pressure control of the clutch C1 by the clutch low pressure control unit 17, and starts the neutral control by the neutral (N) control unit 20.

The rotation number difference detecting unit 18 which detects the difference in rotation number between the engine rotation number Ne and the input shaft rotation number Ni using the engine rotation number sensor 26 and the input shaft rotation number sensor 25 is connected to the neutral control unit 20. The neutral control unit 20 executes a neutral control (details will be described later) for controlling the hydraulic pressure PC1 of the clutch C1 to a predetermined hydraulic pressure (hereinafter, refer to a "standby pressure") PC1$w$ for bringing the clutch C1 into a state immediately before engagement, on the basis of the detection of the rotation number difference detecting unit 18. Further, the start request detecting unit 19 which detects the start request of the driver using the throttle opening degree sensor 27, the brake sensor 23 or the like is connected to the neutral control unit 20. The neutral control unit 20 finishes the neutral control on the basis of the detection of the start request detecting unit 19. In this case, in the present embodiment, the neutral control unit 20 detects the standby pressure PC1$w$ for bringing the clutch C1 into the state immediately before engagement on the basis of the engine rotation number Ne and the input shaft rotation number Ni as mentioned above. However, the configuration is not limited to this. The configuration may be such that the standby pressure PC1$w$ is detected based on the state of the automatic transmission 10 (for example, the change in the input shaft rotation number Ni, the change in rotation number of the clutch C1 and the like).

The learning control unit 21 stores a base pressure PC1$m$ at a time of finishing the neutral control in the manner mentioned above (details will be described later), and outputs it to the clutch control unit 17. The clutch control unit 17 receiving the base pressure controls the hydraulic pressure PC1 so that it becomes equal to the standby pressure PC1$w$ when the hydraulic pressure PC1 of the clutch C1 is controlled to the low pressure in the manner mentioned above (when it is judged that the engine start condition is satisfied).

Figure 14:
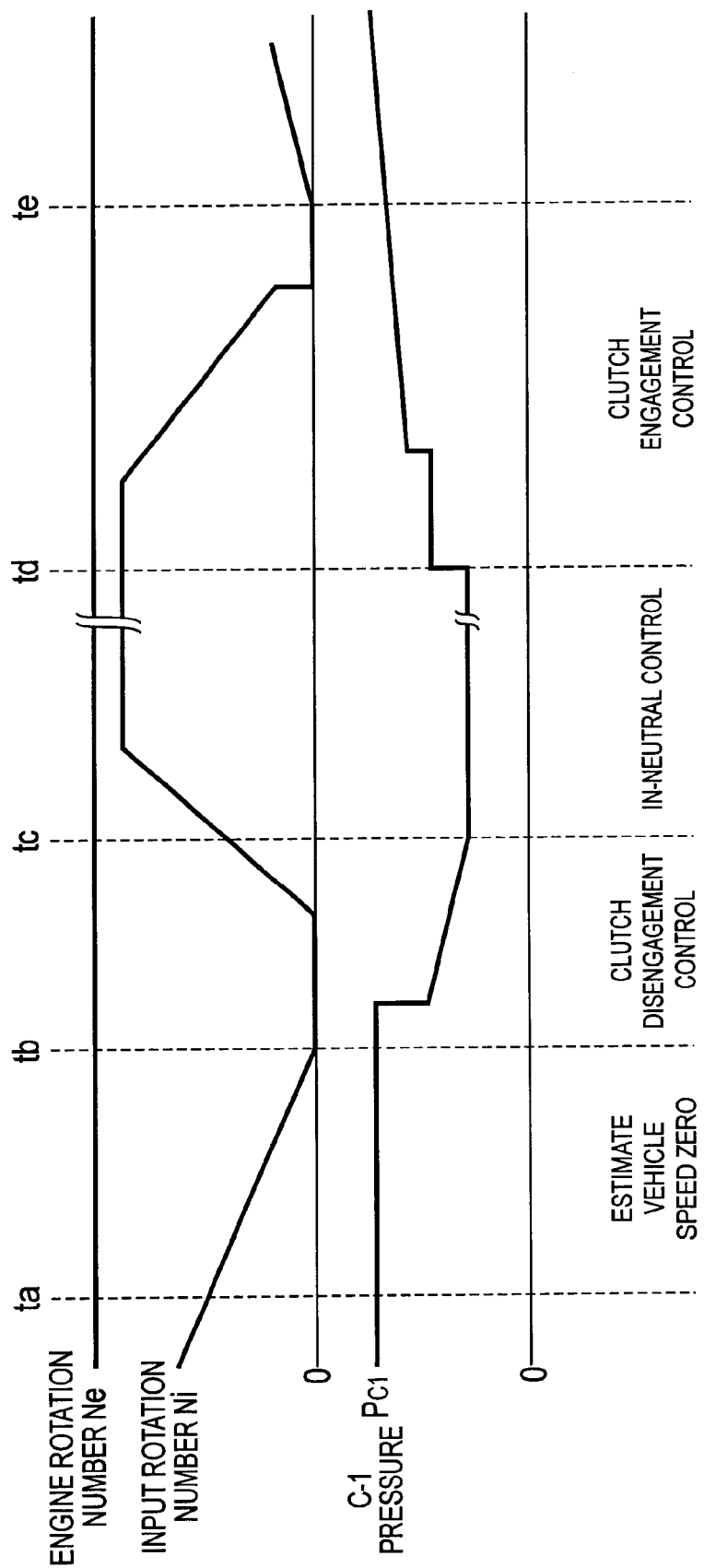
FIG. 14 is a time chart showing one example of the neutral control.

Herein, a description will be given of a normal neutral control with reference to FIG. 14. FIG. 14 is a time chart showing one example of the neutral control. For example, when the vehicle stops in a state in which the shift lever 22 is in a D range and the engine does not stop, the engine rotation number Ne is a substantially fixed idle rotation number, as shown in FIG. 14. When the speed of the vehicle is reduced from a timing ta to a timing tb, the rotation number Ni of the input shaft 37 is decreased by the wheels (not shown) via the automatic transmission mechanism 5 because the clutch C1 is engaged. At this time, the neutral control unit 20 estimates a time when the vehicle speed becomes zero on the basis of a descending rate of the input shaft rotation number Ni. In this state, the torque converter 4 interposed between the input shaft 37 and the engine 2 absorbs the difference between the rotations thereof.

When the input shaft rotation number Ni becomes zero at the timing tb, for example, the throttle opening degree sensor 27 detects that the throttle opening degree is equal to or less than a predetermined value, the brake sensor 23 detects that the brake is turned on, and an oil temperature sensor (not shown) detects that an oil temperature is equal to or more than a predetermined temperature as the neutral control starting condition. Based on the condition, it is judged that the neutral control is to be started. When it is judged that the neutral control is to be started, the neutral control unit 20 executes a clutch disengagement control for gradually reducing (sweeping down) the hydraulic pressure PC1 of the clutch C1 from the timing tb to the timing tc, and controls the hydraulic pressure PC1 so that the clutch C1 is brought into the state immediately before engagement (details of which will be described later). In this case, since the clutch C1 is disengaged, the input shaft rotation number Ni starts rotating in response to a torque applied from the torque converter 4.

Thereafter, between the timing tc and the timing td, the hydraulic pressure PC1 of the clutch C1 is controlled so as to disengage the clutch C1, and there is executed an in-neutral control (details will be described later) for bringing the vehicle into a state in which the power transmission between the input shaft 37 and the wheels is interrupted, that is, a substantially neutral state. Further, at this time, the neutral control unit 20 outputs a signal to the hydraulic control device 6 to engage, for example, the clutch C1, the brakes B1, B2 and B5, engage the one-way clutch F1 and executes a Hill hold control on the basis of a reverse rotation prevention of the one-way clutch F2. In this case, the input shaft rotation number Ni is rotated by the torque output from the torque converter 4.

When detecting the start request output by the driver (for example, a depressing force of the brake pedal becomes equal to or less than a predetermined amount, or the like) at the timing td, the neutral control unit 20 finishes the in-neutral control, finishes the Hill hold control (disengages the brakes B1 and B2 so as to establish the first speed state), executes the clutch engagement control for increasing the hydraulic pressure PC1 of the clutch C1, and gradually engages (sweeps up) the clutch C1 in correspondence to the rotation number difference between the engine rotation number Ne and the input shaft rotation number Ni. Then, the input shaft 37 and the stopped wheels are engaged with each other, and the input shaft rotation number Ni becomes 0. Further, when the clutch C1 is brought into the engagement state at the timing te, the input shaft rotation number Ni increases on the basis of the torque output from the torque converter 4, and the wheels rotate via the engaging clutch C1, that is, the vehicle starts.

Figure 15:
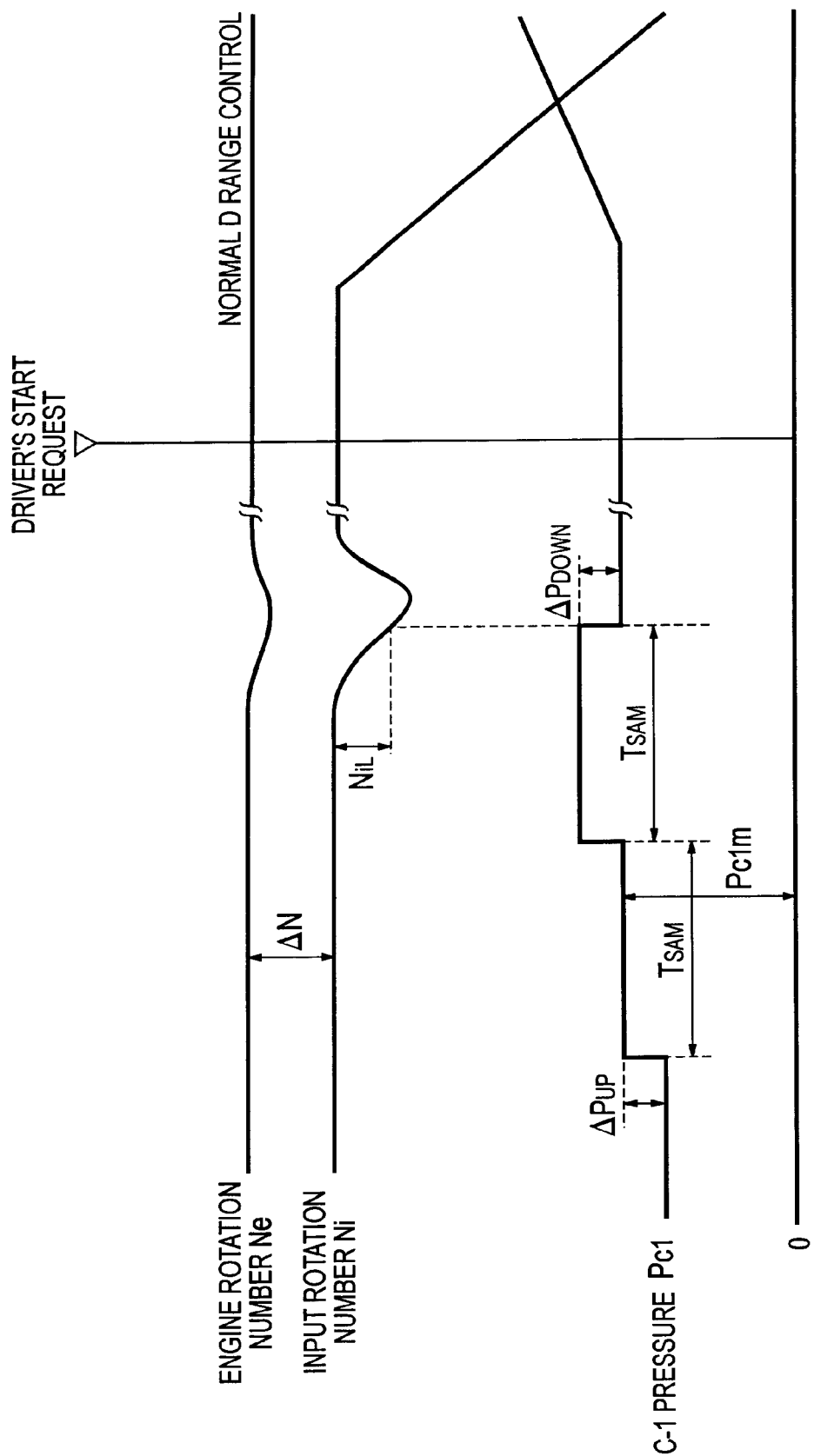
FIG. 15 is a time chart showing in detail a hydraulic control during the in-nuetral control.
Figure 16:
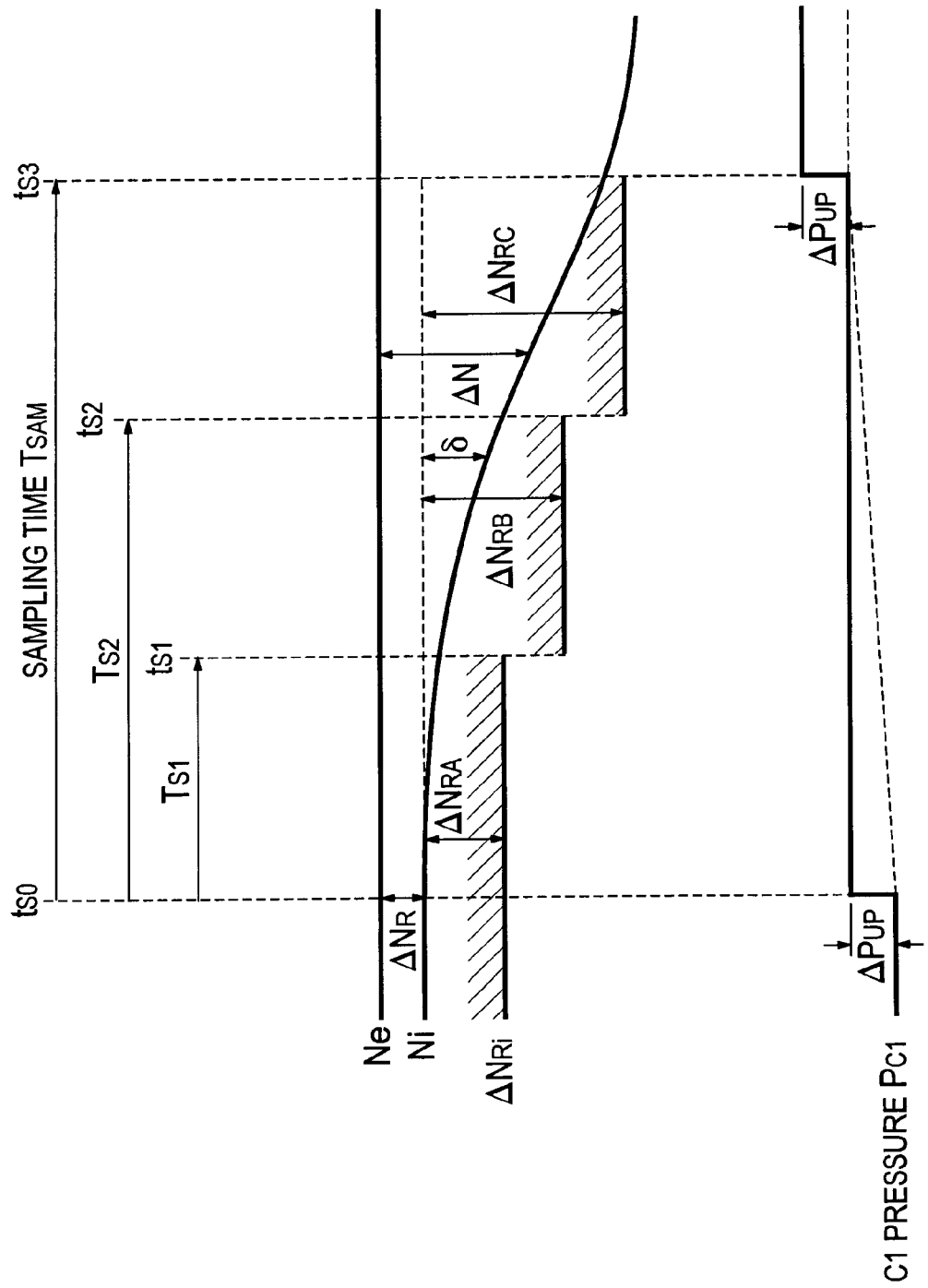
FIG. 16 is a time chart showing a case in which an input clutch is in a dragging area.
Figure 17:
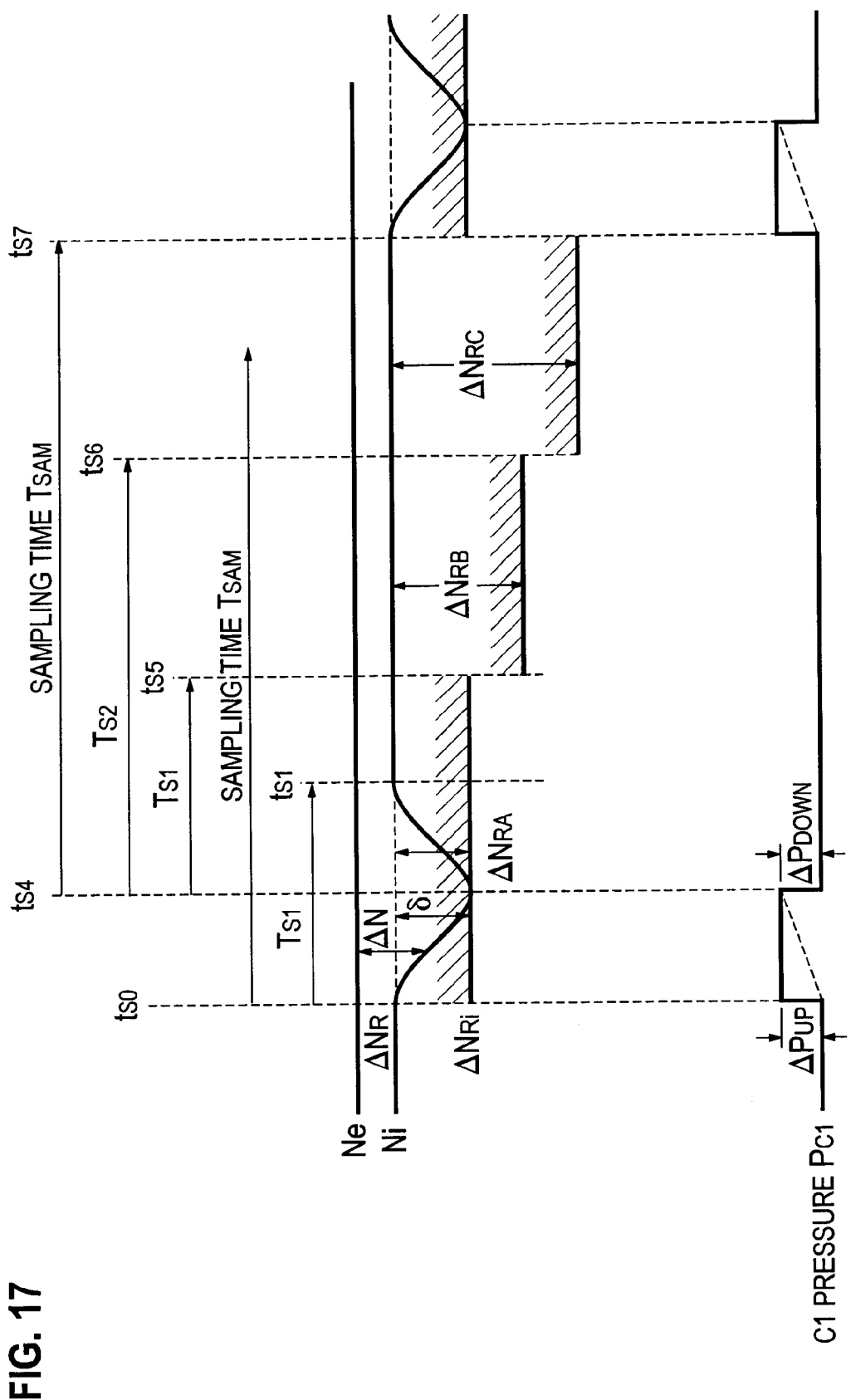
FIG. 17 is a time chart which shows a case in which the input clutch is in a slip area.

Next, a description will be given in detail of a state under the in-neutral control with reference to FIGS. 15 to 17. FIG. 15 is a time chart which in detail shows the hydraulic control under the in-neutral control, FIG. 16 is a time chart showing a case that the input clutch is in a dragging area, and FIG. 17 is a time chart showing a case that the input clutch is in a slip area. As shown in FIG. 15, under the in-neutral control (from the timing tc to the timing td shown in FIG. 14), the hydraulic pressure PC1 of the clutch C1 is controlled to the hydraulic pressure for bringing the clutch C1 into the state immediately before engagement. In this state, the neutral control unit 20 increases the hydraulic pressure PC1 of the clutch C1 by one stage pressure increase amount ΔPUP, and detects the rotation number difference ΔN between the engine rotation number Ne and the input shaft rotation number Ni by the rotation number difference detecting unit 18 using the engine rotation number sensor 26 and the input shaft rotation number sensor 25. Then, the neutral control unit 20 starts the feedback control according to a rate of change ρ on the basis of the rotation number difference ΔN detected by the rotation number difference detecting unit 18, that is, a relation between an amount of change δ in the rotation number difference ΔN, and a time thereof.

At this time, as shown in FIG. 16, the neutral control unit 20 sets a sampling time Tsam from a start timing tS0 to an end timing tS3, and sets change amount threshold values ΔNRi of the rotation number difference ΔN which respectively correspond to a first time TS1 between the start timing tS0 and the timing tS1 obtained by dividing the sampling time Tsam, for example, into three equal parts, a second time TS2 from the start timing tS0 to the timing tS2, and the sampling time Tsam, to change amount threshold values ΔNRA, ΔNRB and ΔNRC with respect to a reference change amount ΔNm. For example, in the case of the dragging area in which the input clutch C1 is not engaged but is slightly in contact, the control is executed so that the change amounts δ of the rotation number difference ΔN are not over the respectively set change amount threshold values ΔNRA, ΔNRB and ΔNRC during the first time TS1, the second time TS2 and the sampling time Tsam, the hydraulic pressure PC1 of the clutch C1 is again increased by the pressure increase amount ΔPUP after the sampling time Tsam, and the same sampling time Tsam is repeatedly set. This control is repeated subsequently.

As shown in FIG. 17, in the case that the change amount δ of the rotation number difference ΔN is over the change amount threshold value ΔNRA, for example, at the timing tS4 (since the same matter is applied to the cases of ΔNRB and ΔNRC, a description thereof will be omitted), the control unit judges that the clutch C1 starts engaging and is in the slip area so as to reduce the hydraulic pressure PC1 of the clutch C1 by one stage pressure reduction amount ΔPDOWN, and sets the sampling time Tsam, that is, sets the change amount threshold values ΔNRA, ΔNRB and ΔNRC of the rotation number difference ΔN corresponding to the sampling time Tsam from the start timing tS4 to the end timing tS7, the first time TS1 from the start timing tS4 to the timing tS5, and the second time TS2 from the start timing tS4 to the timing tS6, respectively, with respect to the reference change amount ΔNm, in the same manner as mentioned above. In this case, since the hydraulic pressure PC1 of the clutch C1 is reduced by the one pressure reduction amount ΔPDOWN, the engagement state of the clutch C1 is going to be returned to the dragging area from the slip area, so that the change amount δ of the rotation number difference ΔN is not substantially changed, and the sampling time Tsam from the start timing tS4 to the end timing tS7 is finished. Then, the hydraulic pressure PC1 of the clutch C1 is again increased by the pressure increase amount ΔPUP. However, the change amount δ is over the change amount threshold value ΔNRA in the same manner, and the hydraulic pressure PC1 of the clutch C1 is reduced by the one stage pressure reduction amount ΔPDOWN. Accordingly, there is executed the feedback control on the basis of the change rate ρ in the rotation number difference ΔN between the engine rotation number Ne and the input rotation number Ni.

Figure 4:
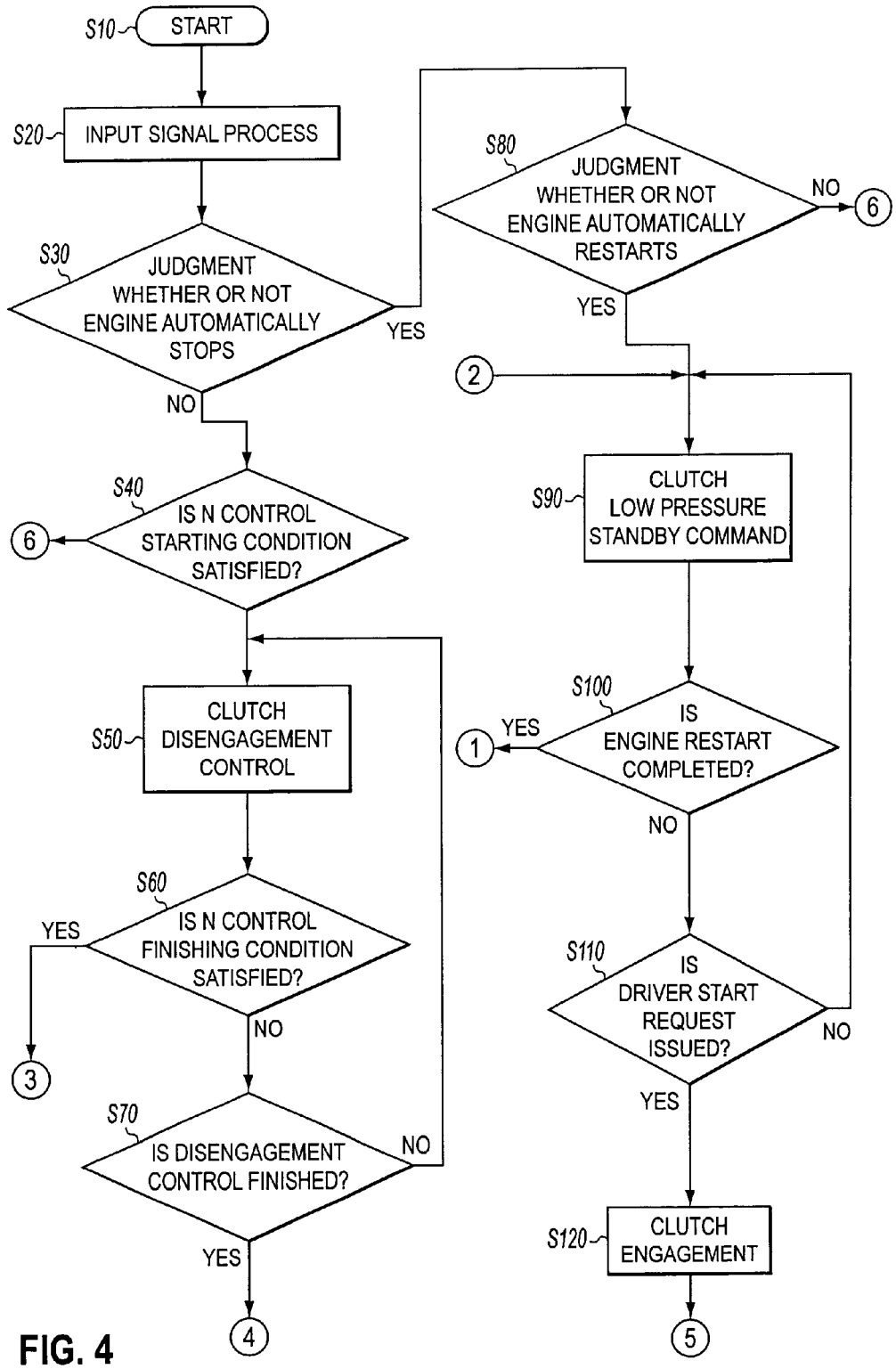
FIG. 4 is a flow chart showing a control of the control apparatus for a vehicle in accordance with the invention.
Figure 5:
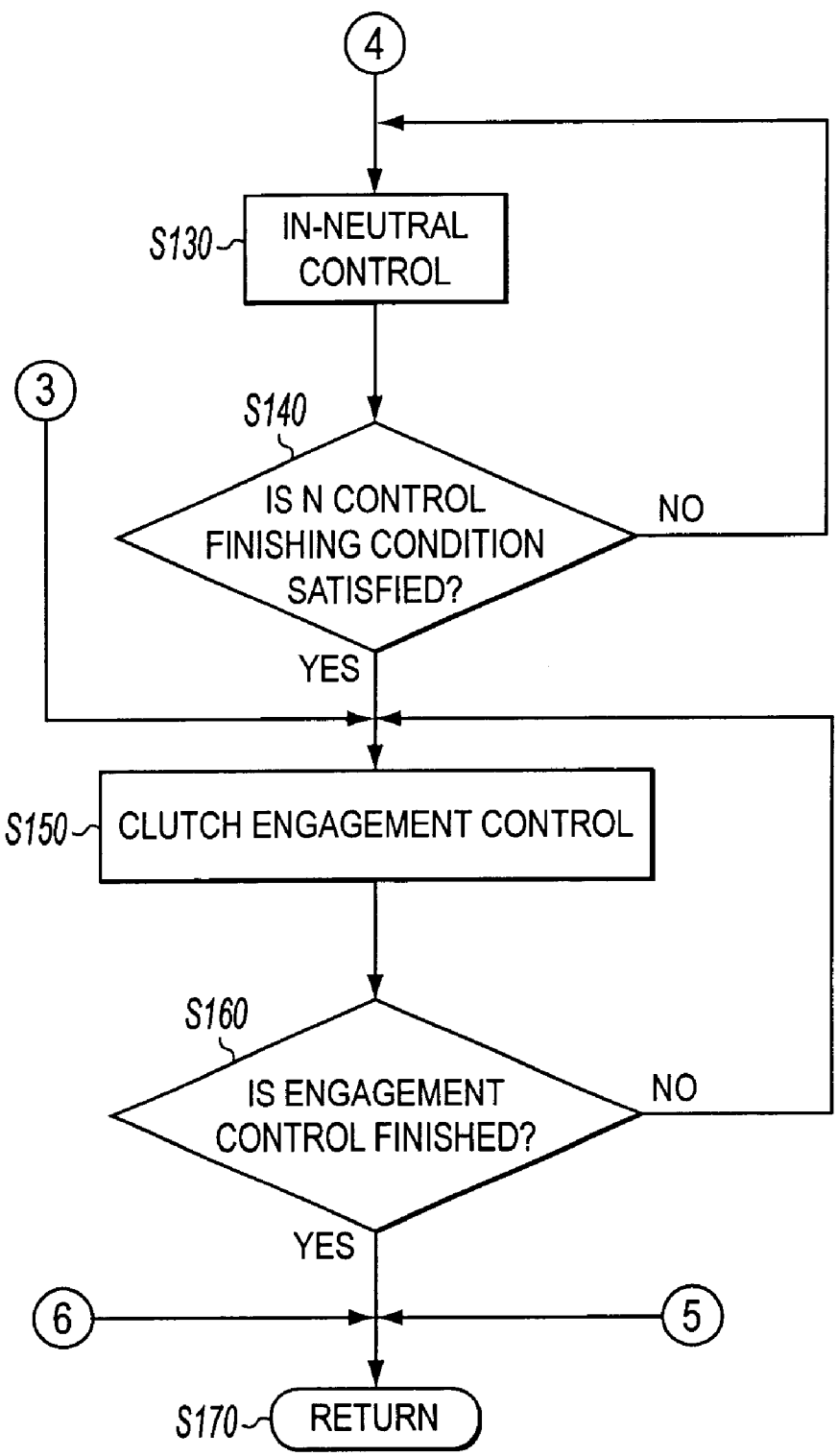
FIG. 5 is a flow chart showing a control of the control apparatus for a vehicle in accordance with the invention.
Figure 6:
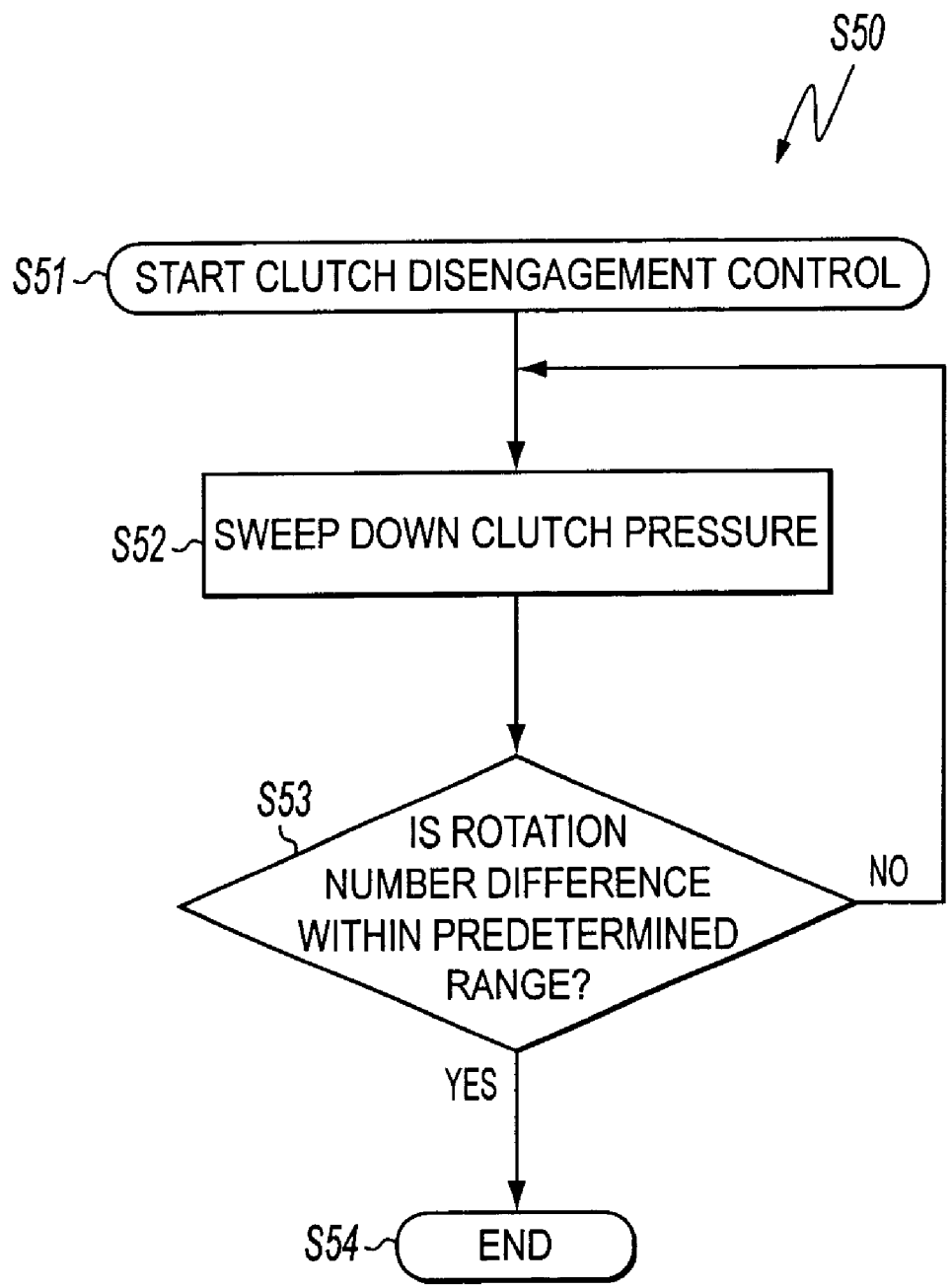
FIG. 6 is a flow chart showing a clutch disengagement control.
Figure 7:
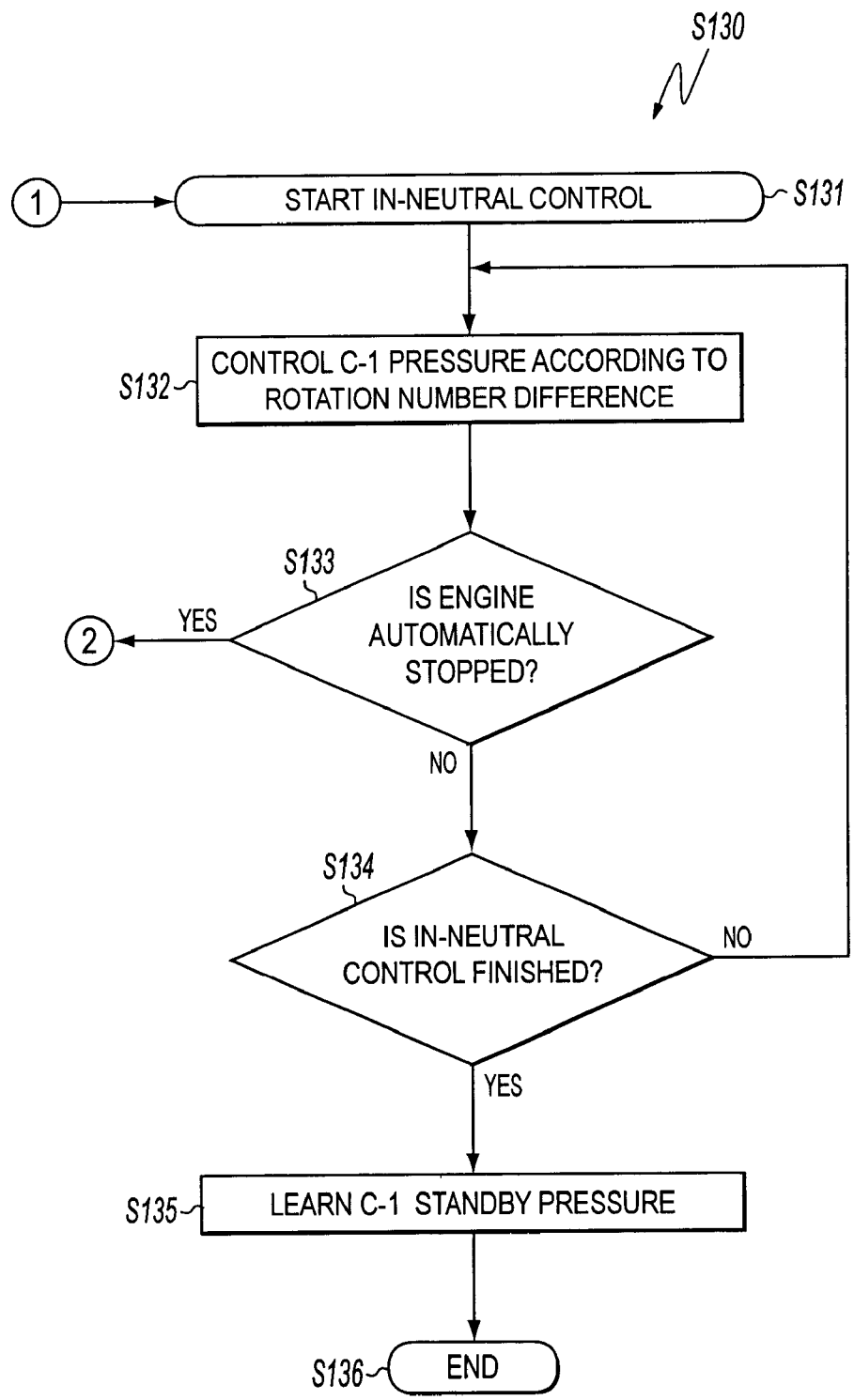
FIG. 7 is a flow chart showing an in-neutral control.
Figure 8:
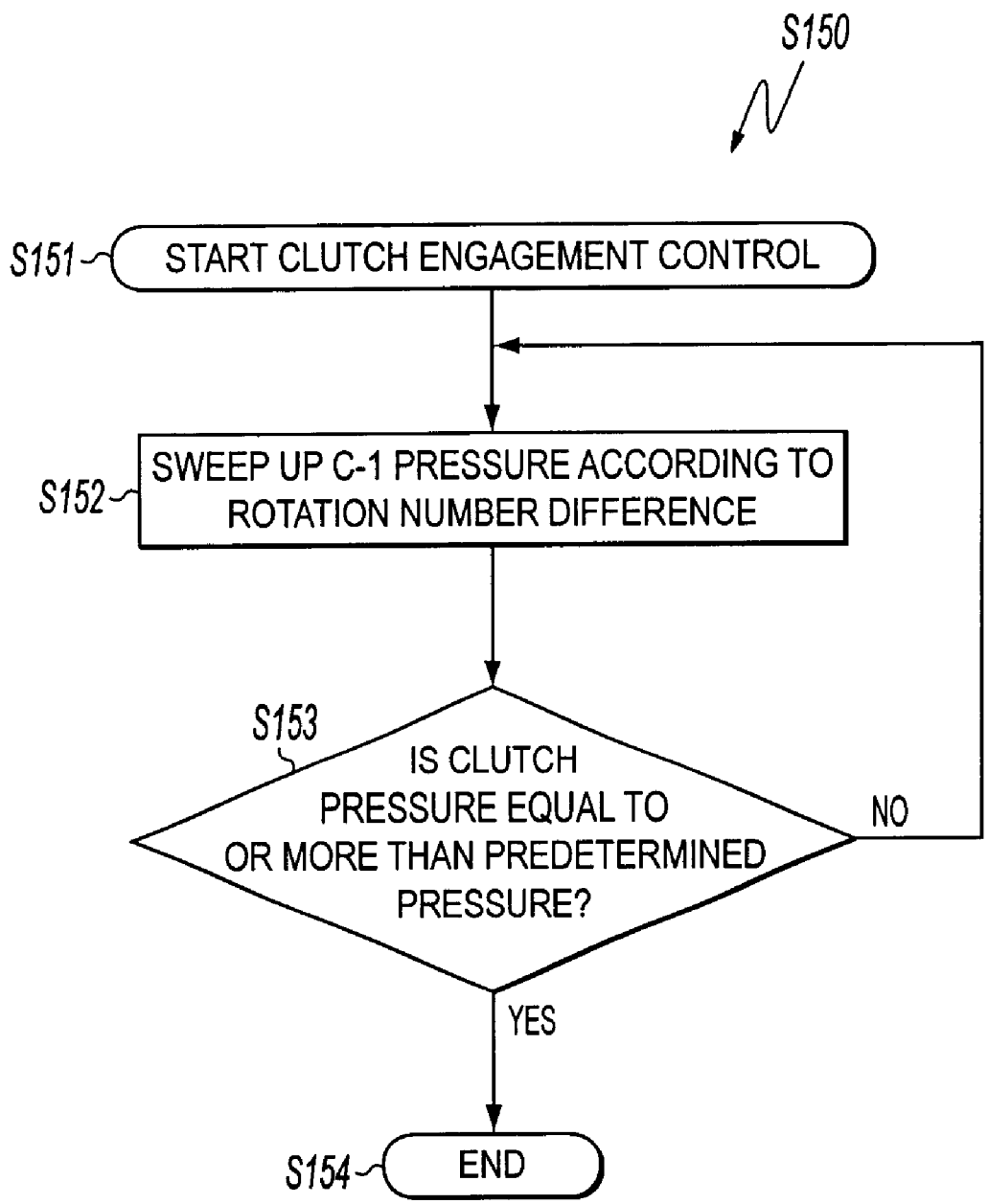
FIG. 8 is a flow chart showing a clutch engagement control.
Figure 9:
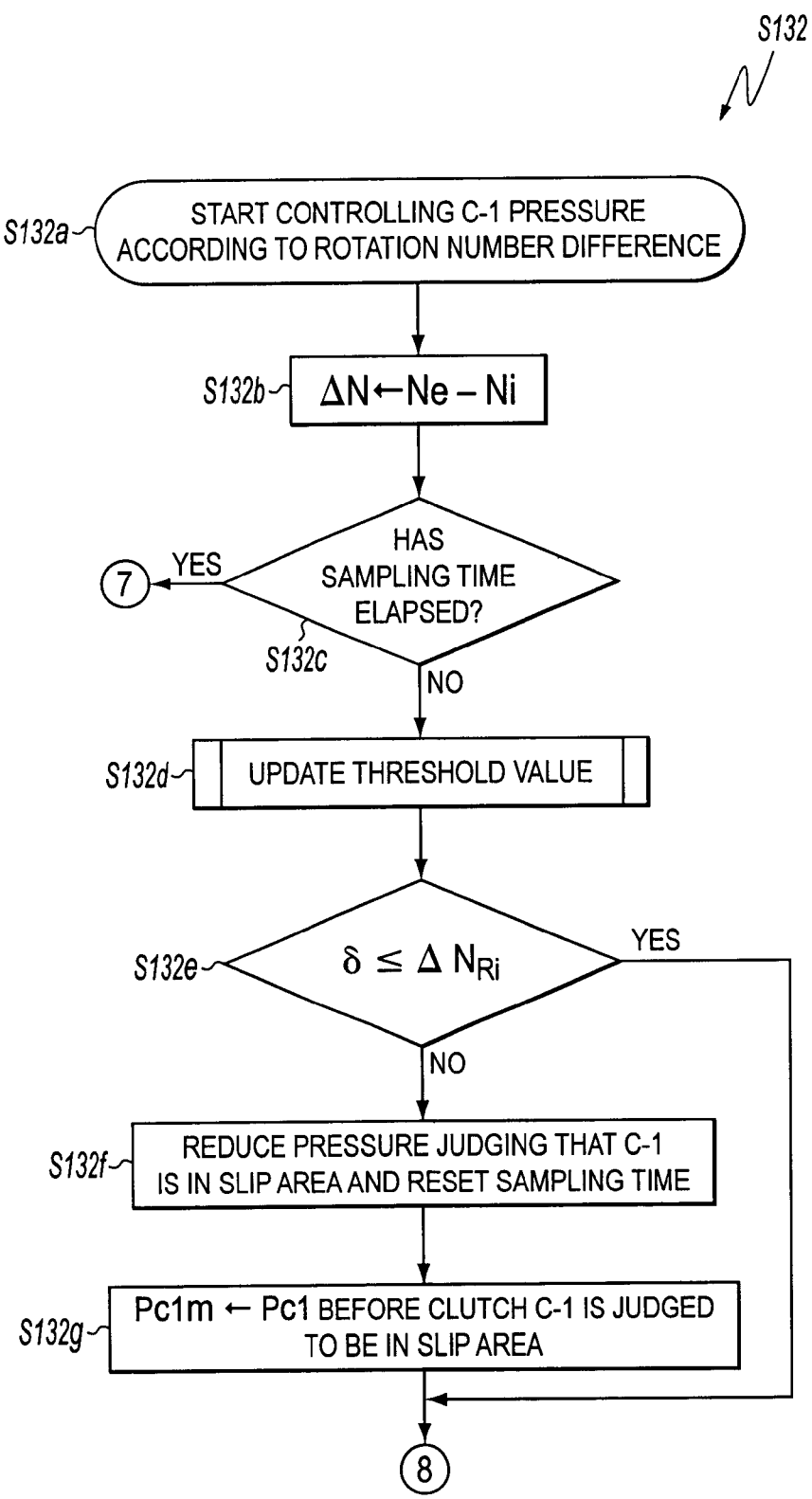
FIG. 9 is a flow chart showing a feedback control in the in-neutral control.
Figure 10:
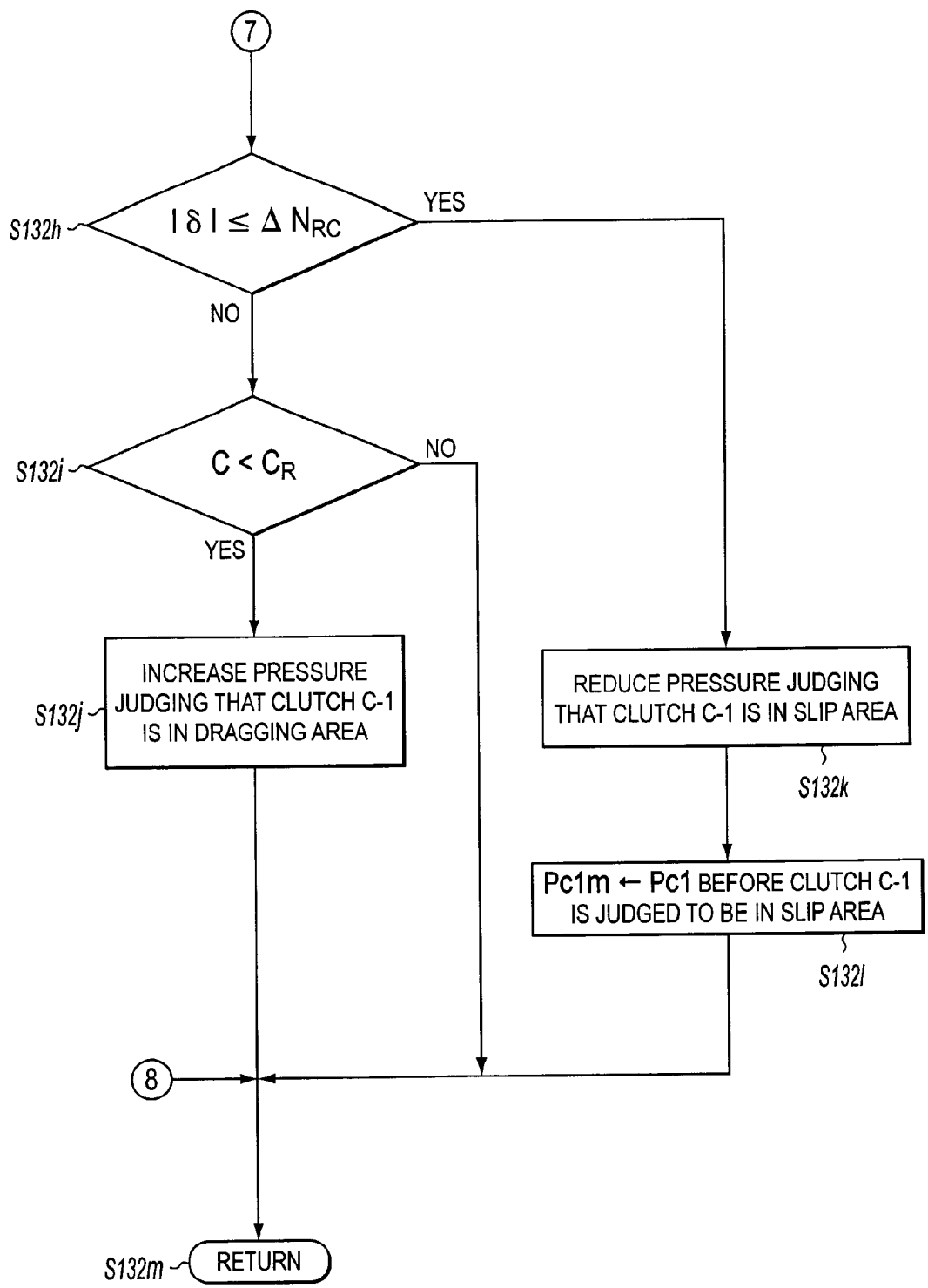
FIG. 10 is a flow chart showing a feedback control in the in-neutral control.
Figure 11:
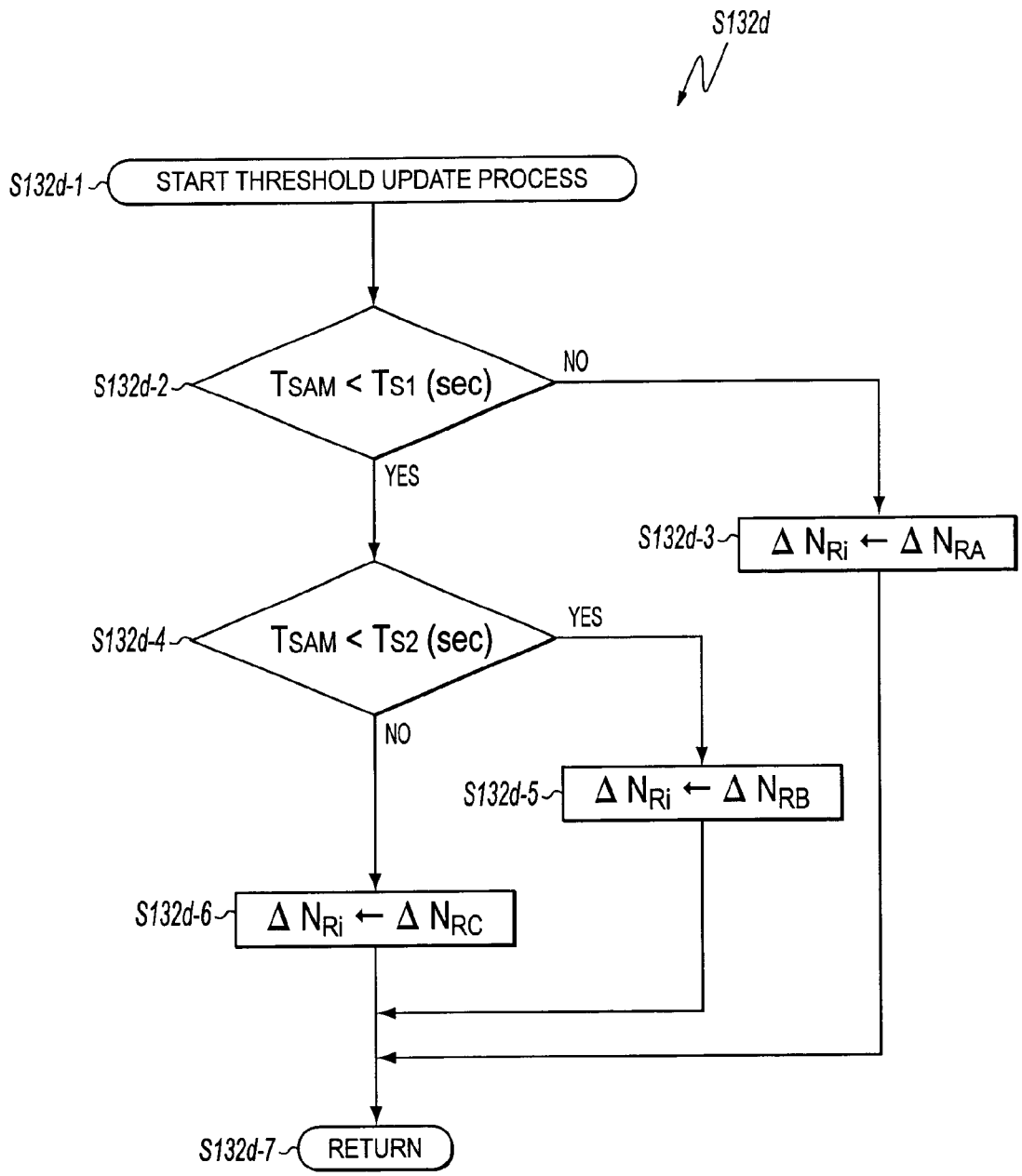
FIG. 11 is a flow chart showing an update process of a threshold value in the feedback control.
Figure 12:
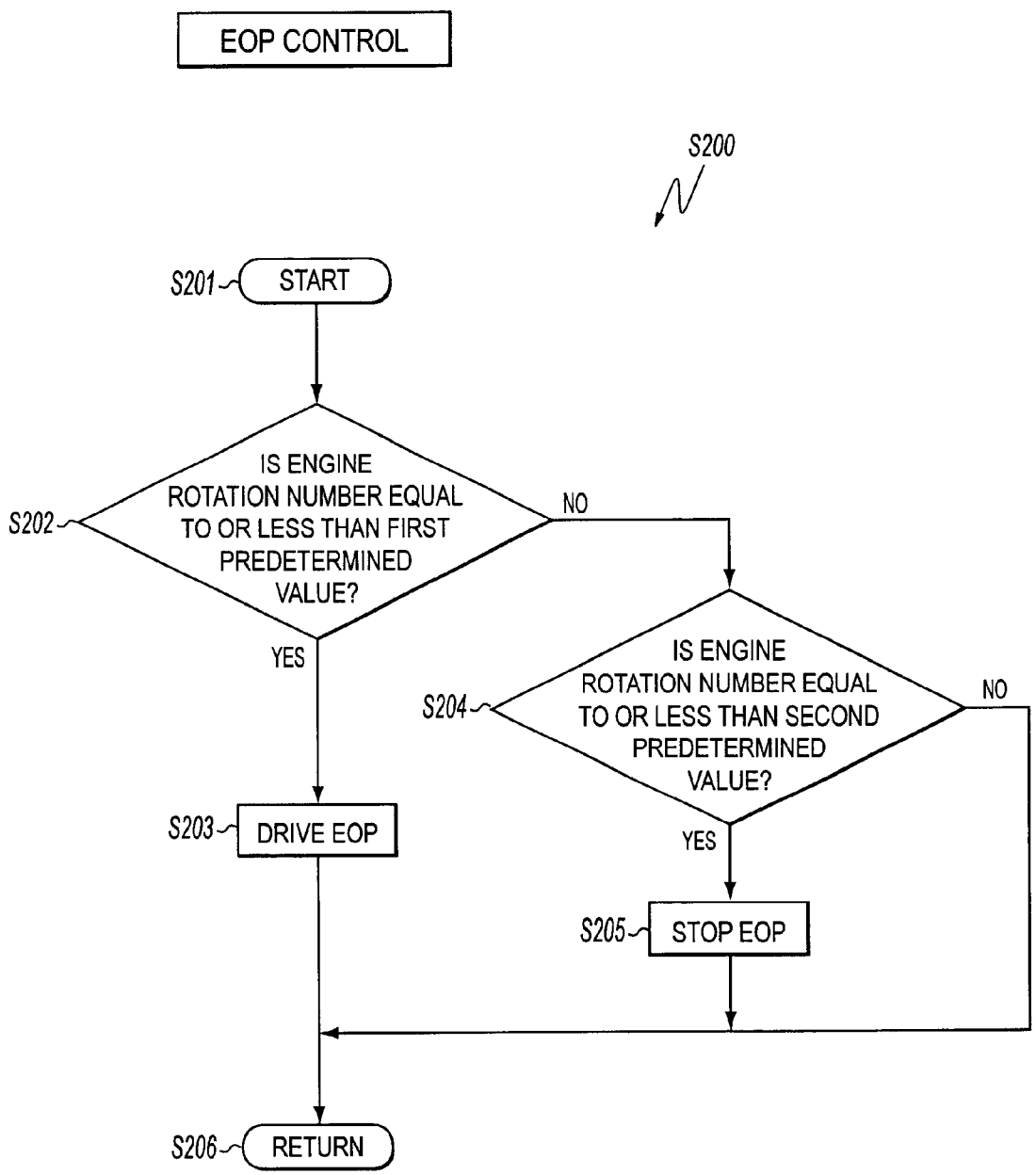
FIG. 12 is a flow chart showing an electrically driven oil pump (EOP) control.

Next, a description will be given of a control of the control apparatus for a vehicle in accordance with an embodiment of the invention with reference to FIGS. 4 to 12. FIGS. 4 and 5 are flow charts showing a control of the control apparatus for a vehicle in accordance with the invention. FIG. 6 is a flow chart showing a clutch disengagement control S50, FIG. 7 is a flowchart showing an in-neutral control S130, FIG. 8 is a flow chart showing a clutch engagement control S150, FIGS. 9 and 10 are flow charts showing a feedback control S132 in the in-neutral control, FIG. 11 is a flowchart showing an update process S132d of the threshold value in the feedback control, and FIG. 12 is a flow chart showing an electrically driven oil pump (EOP) control. In this case, (1) shown in FIG. 4, (2) shown in FIG. 7, (3) shown in FIG. 4, (4) shown in FIG. 4, (5) shown in FIG. 4, (6) shown in FIG. 4, (7) shown in FIG. 9 and (8) shown in FIG. 9 are connected to (1) shown in FIG. 7, (2) shown in FIG. 4, (3) shown in FIG. 5, (4) shown in FIG. 5, (5) shown in FIG. 5, (6) shown in FIG. 5, (7) shown in FIG. 10 and (8) shown in FIG. 10, respectively.

First of all, a description will be given of the electrically driven oil pump (EOP) control S200 with reference to FIG. 12. When starting the control (S201), it is judged whether the engine rotation number Ne is equal to or less than a first predetermined value, for example, corresponding to a value lower than an idling rotation number (S202). If it is judged that it is equal to or less than the first predetermined value, the electrically driven oil pump 8 is driven (S203), and the stop (or the reduction) of the hydraulic pressure supply caused by the stop of the mechanical oil pump 7 interlocked with the engine 2 (or the reduction of the driving force) is compensated by the oil pressure supply of the electrically driven oil pump 8. Further, in step S202, in the case that the engine rotation number Ne is not equal to or less than the first predetermined value, the process goes to step S204 and it is judged whether the engine rotation number Ne is equal to or more than a second predetermined value (S204). In the case that the engine rotation number Ne is not equal to or more than the second predetermined value, the electrically driven oil pump 8 is maintained in the driven or stop state as it is. Further, in the case that the engine rotation number Ne is equal to or more than the second predetermined value, the electrically driven oil pump 8 is stopped (S205).

As mentioned above, since the hydraulic pressure supply of the mechanical oil pump 7 is increased or reduced in proportion to the engine rotation number Ne, the hydraulic pressure supply is executed by the electrically driven oil pump 8 in the case that the hydraulic pressure supply of the mechanical oil pump 7 is reduced. Accordingly, it is possible to constantly supply the hydraulic pressure to the hydraulic pressure PC of the clutch C1. In this case, it is possible to prevent a hunting by making the first predetermined value different from the second predetermined value. Further, in the following description, stopping of the engine 2 unit means driving of the electrically driven oil pump 8, and starting of the engine 2 unit means stopping of the electrically driven oil pump 8. However, the description thereof will be omitted.

Next, when the control of the control apparatus for a vehicle in accordance with an embodiment of the invention is started by the control portion U (S10), first the input signals from the respective sensors (refer to FIG. 1) are processed (S20), and the engine stop condition is judged by the engine stop condition judging unit 11. Then, it is judged whether the engine 2 is being automatically stopped by the engine stopping unit 12 (S30). In the case that the engine 2 is not being automatically stopped, that is, the engine 2 is being driven, the process goes to step S40, and it is judged whether the condition for starting the neutral control is satisfied on the basis of the conditions that the brake is ON, that the throttle opening degree is the predetermined value or less, that the estimated vehicle speed is zero, that the shift range is the D range, and the like. In the case that the conditions are not satisfied, the vehicle is traveling or the start request is issued. Accordingly, the process goes to step S170 in FIG. 5 via (6), and is returned as it is.

In step S40, when the condition for starting the neutral control is satisfied (refer to the timing tb in FIG. 14), the process goes to step S50, and the neutral control unit 20 starts the neutral control as mentioned above. In the neutral control, as shown in FIG. 6, the hydraulic pressure PC1 of the clutch C1 is first reduced and the disengagement control of the clutch C1 (refer to the timing tc from the timing tb in FIG. 14) is started (S51), and the hydraulic pressure PC1 of the clutch C1 is swept down to the standby pressure PC1w (S52). Further, it is judged whether the rotation number difference ΔN between the engine rotation number Ne and the input shaft rotation number Ni which is detected by the rotation number difference detecting unit 18 becomes within a predetermined value (S53). In the case that the rotation number difference does not become within the predetermined value (No in the step S53), the hydraulic pressure PC1 of the clutch C1 does not become the target standby pressure PC1w, so that the sweep down mentioned above (S53) is continued. Thereafter, when the rotation number difference ΔN becomes within the predetermined value (Yes in step S53), the sweep down mentioned above is finished (S54).

When the sweep down mentioned above is finished (that is, step S50 is finished), it is judged whether the disengagement control of the clutch C1 is finished (S70). In the case that the disengagement control of the clutch C1 is not finished, the process goes back to the step S50, and the disengagement control of the clutch C1 is again executed. Further, when it is judged that the hydraulic pressure PC 1 of the clutch C1 becomes equal to the standby pressure PC1w and the clutch disengagement control is finished (Yes in step S70), the process goes to step S130 in FIG. 5 via (4). Further, during this time, when the start request is detected by the start request detecting unit 19 on the basis of the neutral control finishing condition, that is, the condition that the throttle opening degree is equal to or more than the predetermined value, that the brake is turned off or the like, or the condition that the shift range is selected to be the range (for example, an N or P range or the like) other than the non-traveling range (S60), the neutral control is finished. At this time, the process goes to step S150 in FIG. 5 via (3), and in order to again increase the hydraulic pressure PC1 in the middle of the disengagement of the clutch C1 so as to engage the clutch C1, the clutch engagement control mentioned below is executed. In the case that the shift range is selected to be the non-traveling range, the hydraulic pressure PC1 of the clutch C1 is released without executing the engagement of the clutch C1 (S150).

As mentioned above, when the disengagement control of the clutch C1 is finished (S70), the in-neutral control (refer to the timing td from the timing tc in FIG. 14) is started in step S130 in FIG. 5. In the in-neutral control, as shown in FIG. 7, first the in-neutral control is started (S131), and the control of the hydraulic pressure PC1 of the clutch C1 is executed according to the rotation number difference ΔN between the engine rotation number Ne and the input shaft rotation number Ni (S132).

As shown in FIG. 9, when the control of the hydraulic pressure PC1 of the clutch C1 is started according to the rotation number difference ΔN is started (S132a), first, it is judged whether the sampling time Tsam mentioned above (refer to FIGS. 16 and 17) has elapsed (S132c) while detecting the rotation number difference ΔN on the basis of the difference between the engine rotation number Ne and the input rotation number Ni (S132b). In an initial state of the control, on the assumption that the sampling time Tsam has not elapsed (No in S132c), the process goes to step S132d, and a control of updating (setting) the change amount threshold value of the rotation number difference ΔN is started.

When the process goes to step S132d, a threshold value update process is started as shown in FIG. 11 (S132d-1). Then, it is judged whether a first time TS1 of the sampling time Tsam has elapsed (S132d-2), and in the case that the first time TS1 has not elapsed (No in S132d-2), the change amount ΔNRA corresponding to the first time TS1 (S132d-3) is set to the change amount threshold value ΔNRi, and the process is returned (S132d-7), as shown in FIG. 11. Further, in the case that the first time TS1 has elapsed (Yes in S132d-2), it is judged whether a second time TS2 of the sampling time Tsam has elapsed (S132d-4). In the case that the second time TS2 has not elapsed (No in S132d-4), the change amount ΔNRB corresponding to the second time TS2 (S132d-5) is set to the change amount threshold value ΔNRi, and the process is returned (S132d-7). Further, in the case that the second time TS2 has elapsed (Yes in S132d-4), the change amount ΔNRC corresponding to the sampling time Tsam (S132d-6) is set to the change amount threshold value ΔNRi, and the process is returned (S132d-7). The control process mentioned above is repeated.

Next, as shown in FIG. 9, it is judged whether the change amount δ is over the change amount threshold value ΔNRi while executing the control of updating the change amount threshold value in step S132d mentioned above (S132e) (refer to FIGS. 16 and 17). In the case that the change amount δ is not over the change amount threshold value ΔNRi (Yes in S132e) (refer to FIG. 16), the clutch C1 is in the dragging area, so that the process goes to step S132m via (8), and the process is returned to step S132a. Further, in the case that the change amount δ is over the change amount threshold value ΔNRi (No in S132e) (refer to FIG. 17), it is judged that the clutch C1 is in the slip area, the hydraulic pressure PC1 of the hydraulic servo in the clutch C1 is reduced by the one stage pressure reduction amount ΔPDOWN in the manner mentioned above. Then, for example, "1" is added to a counter C mentioned below, and the sampling time Tsam is reset (S132f). Further, the hydraulic pressure PC1 before the hydraulic pressure PC1 of the clutch C1 is judged to be in the slip area, that is, the hydraulic pressure PC1 in the final stage of the dragging area is stored as the standby pressure PC1m (S132g), and thereafter the process goes to step S132*m* via (8) and is returned to step S132*a*. In this case, the standby pressure PC1*m* stored at this time is the hydraulic pressure PC1 before the hydraulic pressure PC1 of the clutch C1 is judged to be in the slip area (that is, the hydraulic pressure before it is increased by the one stage pressure increase amount). However, it may be the hydraulic pressure PC1 after it is reduced by the one stage pressure reduction amount ΔPDOWN.

On the contrary, in step S132*c* mentioned above, in the case that it is judged that the sampling time Tsam has elapsed (Yes in S132*c*), the process goes to step S132*h* via (7), and it is judged whether an absolute amount of the change amount δ is over the change amount threshold value ΔNRC with respect to the sampling time Tsam. In step S132*e*, in the case that the change amount δ is not over the change amount threshold value ΔNRC (No in S132*h*), there are two cases, that is, a case that the change amount δ is not over the change amount threshold value ΔNRC irrespective of one stage pressure increase, for example, as shown in FIG. 16, and a case that the change amount δ is not over the change amount threshold value ΔNRC until the next pressure increase after the one stage pressure reduction, for example, as shown in FIG. 17. Accordingly, a counter threshold value CR is set, and a judgement of the above matter is executed on the basis of the counter C which is, for example, constructed such that "1" is added in the case the sampling time Tsam mentioned above is reset. For example, in the case that the change amount δ is in the dragging area irrespective of the one stage pressure increase as shown in FIG. 16 and is not over the change amount threshold value ΔNRC, the counter C is equal to or less than the counter threshold value CR (Yes in step S132*i*), the hydraulic pressure PC1 of the clutch C1 is increased by the one stage pressure amount, the counter C is subtracted, for example, by "1" (S132*j*), and the process is returned (S132*m*). Further, in the case that the change amount δ is in the dragging area after being reduced by the one stage pressure amount as shown in FIG. 17 and is not over the change amount threshold value ΔNRC, the counter C is equal to or more than the counter threshold value CR (that is, the counter C is added repeatedly by the repeated resetting of the sampling time Tsam) (No in the step S132*i*), and the process is not returned (S132*m*), that is, the hydraulic pressure PC1 of the clutch C1 is not increased during the sampling time Tsam as shown in FIG. 17.

Further, as shown in FIG. 17, when the pressure is increased by the one stage in the case that the sampling time Tsam is finished, and the change amount δ is over the change amount threshold value ΔNRC in step S132*h* (Yes in S132*h*), the pressure is reduced by the one stage because the clutch C1 at this time must be in the slip area (S132*k*), the hydraulic pressure PC1 before the hydraulic pressure PC1 of the clutch C1 is judged to be in the slip area, that is, the hydraulic pressure PC1 at the final stage in the dragging area is stored as the standby pressure PC1*m*, in the same manner as the step S132*g* (S132*l*). Then, the process goes to step S132*m* and is returned to step S132*a*. In this case, the standby pressure PC1*m* stored in the same manner at this time is the hydraulic pressure PC1 before the hydraulic pressure PC1 of the clutch C1 is judged to be in the slip area (that is, the hydraulic pressure before being increased by the one stage pressure amount). However, it may be the hydraulic pressure PC1 after being reduced by the one stage pressure reduction amount ΔPDOWN.

Referring back to FIG. 7, when executing the control of the hydraulic pressure PC1 of the clutch C1 according to the rotation number difference as mentioned above (S132), first, it is judged whether the in-neutral control is finished (S134).

In the case that it is not finished (No in the step S134), the in-neutral control is continued. Thereafter, in the case that the start request from the driver (that is, the fact that the brake is turned off, that the throttle opening degree is equal to or more than the predetermined value, or the like) is detected by the start request detecting unit 19, or in the case that the shift range is selected to be the range other than the forward range, the in-neutral control is finished (Yes in S134), the standby pressure PC1*w* is learned (stored) in the manner mentioned above (S135), and the process is finished (S136). Further, if it is detected that the engine rotation number Ne is equal to or less than the predetermined rotation number during the above time, it is judged that the engine 2 is automatically stopped (S133), the process goes to the step S90 via (2), and a clutch low pressure standby command (details will be described later) is executed.

When the in-neutral control (S130) is finished, it is judged whether the neutral control finishing condition is satisfied, that is, whether the condition that the start request from the driver (the fact that the brake is turned off, that the throttle opening degree is equal to or more than the predetermined value, or the like) is detected by the start request detecting unit 19, or the condition that the shift range is selected to be the range other than the D range is satisfied (140). In the case that the condition is not satisfied (No in the step S140), the in-neutral control is again executed (S130). On the contrary, in the case that the condition is satisfied (Yes in the step S140) (refer to FIG. 12 and the timing td in FIG. 14), the clutch engagement control is executed (S150). In the clutch engagement control, first, the clutch engagement control is started as shown in FIG. 8 (S151), and the hydraulic pressure PC1 of the clutch C1 is swept up according to the rotation number difference ΔN between the engine rotation number Ne and the input shaft rotation number Ni as mentioned above (S152). Then, it is judged whether the hydraulic pressure PC1 of the clutch C1 is equal to or more than the predetermined pressure (S153). In the case that the hydraulic pressure of the clutch C1 is not equal to or more than the predetermined pressure (No in the step S153), the sweep-up mentioned above is continued. Thereafter, when the hydraulic pressure PC1 of the clutch C1 becomes equal to or more than the predetermined pressure (Yes in the step S153), the clutch engagement control is finished (S154) and the process goes to step 5160.

In step S160, it is judged whether the engagement control of the clutch C1 is finished. In the case that the engagement control is not finished (No in the step S160), the clutch engagement control is again executed. Then, in the case that the hydraulic pressure PC1 of the clutch C1 becomes equal to or more than the predetermined pressure as mentioned above, and the engagement control is finished (Yes in the step S160), the process goes to step S170, and is returned to step S10.

Figure 13:
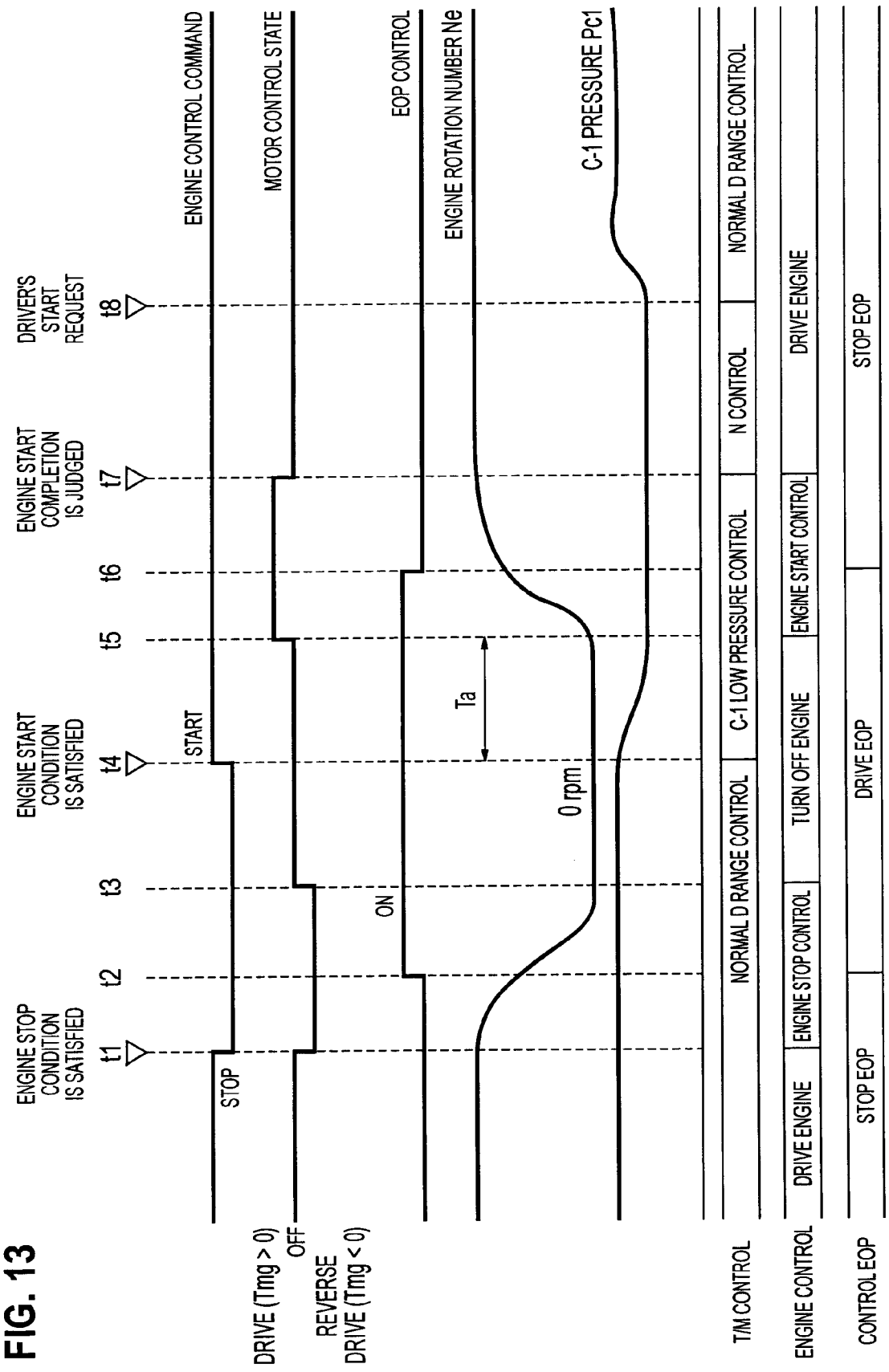
FIG. 13 is a time chart showing a time at which a restart of the engine is executed in an engine stop state when the vehicle is in a stop state.

Next, a description will be given of the control at a time when the engine 2 is restarted from the stop state of the engine 2 in the stop state of the vehicle, based on the start condition other than the start request, which is the main portion of an embodiment of the invention, with reference to FIGS. 4 to 13. FIG. 13 is a time chart showing a time when the restart of the engine is executed from the engine stop state in the stop state of the vehicle. For example, as shown in the timing t1 in FIG. 13, when the vehicle is stopped and the engine stop condition is satisfied, and this is judged by the engine stop condition judging unit 11, an engine control command becomes the "stop", and the stop of the engine 2 is started by the engine stop unit 12. At this time, the shock accompanying the engine stop is reduced by reversely driving the motor generator 3. Further, since the mechanical oil pump 7 stops according to the engine stop, the electrically driven oil pump 8 is turned on by the EOP control unit 15 at timing t2. When the engine stop is completed at timing t3, the motor generator 3 is also stopped, and the engine stop is completed. Then, in step S30 in FIG. 4, it is judged that the engine 2 is being automatically stopped, and first it is judged whether the engine 2 is automatically restarted (S80). In the case that the engine 2 continues to stop as it is (No in S80), the process goes to step 5170 via (6), that is, no control is executed, so that the clutch C1 is in the engaged state (for example, the state of the normal D range).

When the engine start condition other than the start request mentioned above (for example, the engine start condition due to the lack of the battery remaining amount, the ON of the air conditioner and the like) is satisfied at timing t4, the engine control command becomes the "start", and is judged by the engine start condition judging unit 13, that is, it is judged that the engine automatic restart is to be executed (Yes in step S80). Then, first, the low pressure control is started so that the hydraulic pressure PC1 of the clutch C1 becomes equal to the standby pressure PC1$w$ corresponding to the target fixed pressure by the clutch low pressure control unit 17 (S90). Meanwhile, the engine starting unit 13 does not start the start of the engine 2 until the predetermined time Ta has elapsed by a timer (not shown) or the like, and starts driving the engine 2 after the predetermined time Ta. That is, since the engine 2 is not started during controlling the hydraulic pressure PC1 of the clutch C1 to the low pressure, it is possible to prevent the engine 2 from starting when the clutch C1 is in the engaged state. That is, it is possible to prevent the driver from having a uncomfortable feeling such as the shock, the vibration or the like, due to the restart of the engine 2 in accordance with the condition other than the start request (that is, the restart of the engine 2 which is not expected by the driver).

When the predetermined time Ta has elapsed at timing t5, the engine starting unit 14 starts driving the engine 2. Meanwhile, since the mechanical oil pump 7 is driven according to the start of the engine 2 at timing t6, the electrically driven oil pump 8 is turned off by the EOP control unit 15. Further, when the start of the engine 2 is completed at timing t7, and the start of the engine 2 is detected by the engine state detecting unit 16 (S100), the in-neutral control is started by the neutral control unit 20 (S131). In the case that the start request from the driver is detected by the start request detecting unit 19 during the period (between timing t5 and timing t7) (S110), in order to engage the clutch C1, the hydraulic pressure PC1 which is reduced by the low pressure control mentioned above is again increased so as to engage the clutch (S120), the vehicle is started, and the control mentioned above is repeated (S170). The configuration may be made such that the in-neutral control is started by the neutral control unit 20 when it is detected by the engine state detecting unit 16, for example, that the engine rotation number Ne is equal to or more than the predetermined rotation number.

When the in-neutral control is started at timing t7 (S130), the hydraulic pressure PC1 of the clutch C1 is feedback-controlled according to the rotation number difference ΔN which is detected by the rotation number difference detecting unit 18 in the manner mentioned above. Therefore, it is possible to properly bring the clutch C1 into the state immediately before engagement. Thereafter, when the start request detecting unit 19 detects the start request from the driver at timing t8 (or it is detected that the shift range is selected to be the range other than the forward range), the neutral control unit 20 finishes the in-neutral control so as to cancel the feedback control, and the learning control unit 21 stores the standby pressure PC1$w$ at a time of canceling so as to execute the next low pressure control of the clutch C1 on the basis of the standby pressure PC1$w$ mentioned above (S132$g$ and S132$l$). Then, the engagement control of the clutch C1 is executed (S150 and S160), and the vehicle is started.

As mentioned above, the neutral control unit 20 executes the neutral control after starting the engine so as to bring the clutch C1 into the state immediately before engagement, thereby preventing the engagement of the clutch C1 from being delayed at a time when the start request from the driver is issued. Further, the learning control unit 21 stores the standby pressure PC1$w$ at a time of canceling as mentioned above so as to execute the next low pressure control of the clutch C1 on the basis of the standby pressure PC1$w$. Thus, the hydraulic pressure PC1 of the clutch C1 is controlled to the optimum hydraulic pressure for bringing the clutch C1 into the state immediately before engagement when the low pressure control is executed by the clutch low pressure control unit 17. Accordingly, it is possible to execute the low pressure control according to the change in time lapse or the like, and it is possible to respond to the change in time lapse or the like while preventing the driver from having an uncomfortable feeling such as the shock, the vibration or the like due to the restart of the engine 2 based on the condition other than the start request from the driver.

In the embodiment of the invention, since the hydraulic pressure is constantly supplied to the hydraulic servo of the clutch C1 by the electrically driven oil pump 8 and the EOP control unit 15, the control executed by the clutch low pressure control unit 17 is the control for decreasing the hydraulic pressure to the value immediately before engagement at a time of controlling the restart of the engine 2. However, in the vehicle which is not provided with the electrically driven oil pump 8 and the EOP control unit 15, the control of the clutch low pressure control unit 17 may be the control for restricting the hydraulic pressure of the hydraulic servo in the clutch CI, which is increased by the mechanical oil pump 7 driven according to the restart control of the engine 2, to the hydraulic pressure immediately before engagement.

As mentioned above, in accordance with the control apparatus for a vehicle of an embodiment of the invention, in the case that the engine 2 is controlled to be restarted while the vehicle is stopped and the automatic stop control of the engine 2 is executed, the clutch low pressure control unit 17 executes the low pressure control of the hydraulic pressure PC1 of the clutch C1 so that the clutch C1 is brought into the state immediately before engagement. Accordingly, the clutch C1 is not engaged when the engine 2 is restarted so as to make it possible to prevent the vehicle from starting without the driver's intention of starting the vehicle, while it is possible to immediately engage the clutch C1 by the hydraulic pressure PC1 when the start request from the driver is issued. Further, it is possible to eliminate the necessity of performing complicated controls required in the conventional art, for example, the control for relatively slowly increasing the hydraulic pressure of the clutch C1 after rapidly increasing the line pressure supplied to the clutch C1, and the complicated control of the changeover valve or the like. Further, it is possible to prevent the driver from having an uncomfortable feeling such as the shock, the vibration or the like by the relatively simple control as mentioned above.

In the present embodiment, the neutral control is executed after the engine start is completed. However, since the low pressure control is executed to bring the clutch into the state immediately before engagement by the clutch low pressure control unit, the low pressure control may be executed until the start request is detected. In this case as well, it is also possible to prevent a delay in the engagement of the clutch when the start request from the driver is generated.

Further, in the present embodiment, the low pressure control of the input clutch is executed such that the power transmission between the engine 2 and the drive wheels can be interrupted and can be immediately established. However, the low pressure control of the hydraulic pressure of the other clutch and brake, a plurality of clutches, a plurality of brakes, a combination of the clutch and the brake, or the like, may be executed. The configuration is not limited to this, and any configuration may be employed as long as the low pressure control is executed such that the power transmission between the engine 2 and the drive wheel can be interrupted and can be immediately established.

Further, in the control apparatus for a vehicle in accordance with an embodiment of the invention, when the engine 2 is controlled to be restarted while the vehicle is stopped and the automatic stop control of the engine 2 is executed, the clutch low pressure control unit 17 executes the low pressure control of the hydraulic pressure PC1 of the clutch C1 to the standby pressure PC1$w$ corresponding to the predetermined hydraulic pressure for bringing the clutch C1 into the state immediately before engagement. Accordingly, without any other control, it would not be possible to respond to the change in time lapse, for example, when the hydraulic pressure immediately before the clutch C1 is engaged is changed due to the abrasion of the clutch C1, the change in the supplied hydraulic pressure or the like. However, since the neutral control unit 20 starts the feedback control after the engine start so as to make the hydraulic pressure PC1 of the clutch C1 to a value immediately before the engagement, it is possible to respond to the change in time lapse as mentioned above while making it possible to prevent a delay in the engagement of the clutch C1 at a time when the start request from the driver is issued. Further, since the neutral control unit 20 sets the start hydraulic pressure of the feedback control to the standby pressure PC1$w$ which is controlled by the clutch low pressure control unit 17, it is possible to bring the clutch C1 into the state immediately before engagement with a high accuracy in a relatively short time. Further, since the neutral control unit 20 executes the feedback control on the basis of the change rate ρ of the rotation number difference ΔN (the change amount 6 in the sampling time Tsam), it is possible to properly bring the clutch C1 into the state immediately before engagement.

In the present embodiment, the standby pressure PC1$w$ of the clutch C1 is set on the basis of the rotation number difference between the engine rotation number Ne and the input shaft rotation number Ni. However, the configuration may be, for example, such that the rotation number sensor is provided in the clutch C1, the acceleration sensor is provided in the input shaft 37, and the like. Further, the configuration is not limited to this, and any configuration may be employed as long as it is possible to detect that the clutch C1 is in the state immediately before engagement.

Further, in the present embodiment, the power transmission between the engine 2 and the drive wheel can be interrupted and can be immediately established by the neutral control of the hydraulic pressure of the input clutch. However, the neutral control of the hydraulic pressure of the other clutch, brake, a plurality of clutches, a plurality of brakes, a combination of the clutch and the brake, or the like may be executed. Further, the configuration is not limited to this, and any configuration can be employed as long as the neutral control can be executed such that the power transmission between the engine 2 and the drive wheel can be interrupted and can be immediately established.

Further, in the present embodiment, the neutral control unit 20 executes the feedback control on the basis of the change rate ρ of the rotation number difference ΔN which is detected by the rotation number difference detecting unit 18 (the change amount δ in the sampling time Tsam). However, the configuration may be, for example, such that the rotation number difference ΔN is feedback-controlled to a predetermined target rotation number difference for bringing the clutch C1 into the state immediately before engagement.

Further, in the control apparatus for a vehicle in accordance with an embodiment of the invention, the clutch low pressure control unit 17 executes the low pressure control for making the hydraulic pressure the standby pressure PC1$w$ which is a fixed predetermined hydraulic pressure. Accordingly, without any other control, it would not be possible to respond to the change in time lapse, for example, the abrasion of the clutch, the change of the supplied hydraulic pressure, and the like. In addition, there would be the possibility that the clutch C1 is slightly engaged. Accordingly, there would be the possibility that the driver has an uncomfortable feeling such as the shock, the vibration or the like at a time of restarting the engine based on the condition other than the start request. However, since the learning control unit 21 stores the hydraulic pressure PC1$m$ when neutral control unit 20 executes the feedback control, and executes learning so that the low pressure control is executed on the basis of the hydraulic pressure PC1$m$, it is possible to control the hydraulic pressure PC1 of the hydraulic servo in the clutch C1 to the optimum hydraulic pressure for bringing the clutch C1 into the state immediately before engagement. Accordingly, it is possible to execute the low pressure control in response to the change in time lapse, and it is possible to prevent the driver from having an uncomfortable feeling such as the shock, the vibration and the like due to the restart of the engine 2 based on the condition other than the start request.

Further, when the start request from the driver is detected by the start request detecting unit 19, the neutral control unit 20 cancels the neutral control, the learning control unit 21 stores the final hydraulic pressure PC1$m$ at the canceling time, and the low pressure control is executed on the basis of the final hydraulic pressure PC1$m$ in the next low pressure control which is executed by the clutch low pressure control unit 17. Accordingly, it is possible to store the hydraulic pressure PC1$m$ that is made optimum by repeated feedback in accordance with the neutral control, which is the so-called feedback control. In addition, it is possible to execute the next low pressure control on the basis of the hydraulic pressure PC1$m$ that is made optimum. That is, it is possible to execute the low pressure control to respond to the change in time lapse on the basis of the optimum hydraulic pressure PC1$m$, and it is possible to suitably prevent the driver from having an uncomfortable feeling such as the shock, the vibration or the like due to the restart of the engine 2 based on the condition other than the start request. Meanwhile, it is possible to immediately engage the clutch C1 when the start request from the driver is issued.

In the present embodiment, the learning control unit 21 starts the neutral control after the clutch low pressure control unit 17 executes the low pressure control, and stores the standby pressure PC1$m$ at the canceling time. However, the stored standby pressure PCw1 may be the hydraulic pressure during the normal neutral control. That is, the stored standby pressure PCw1 may be the hydraulic pressure at any time during the neutral control as long as the hydraulic pressure immediately before the clutch is engaged can be stored.

Further, in the present embodiment, the low pressure control is executed so that the power transmission between the engine 2 and the drive wheels can be interrupted and can be immediately established on the basis of the learning control of the hydraulic pressure of the input clutch. However, the learning control may be the learning control of the hydraulic pressure of the other clutch and brake, a plurality of clutches, a plurality of brakes, a combination of the clutch and the brake, or the like. Further, the configuration is not limited to thus, and any configuration may be employed as long as it is possible to execute learning for executing the low pressure control such that the power transmission between the engine 2 and the drive wheels can be interrupted and can be immediately established.

Further, in the present embodiment, the frictional engagement element is the input clutch which is engaged with at least the forward first speed stage in a plurality of frictional engagement elements so as to transmit the rotation of the input shaft to which the output of the engine is input. Therefore, it is possible to interrupt the power transmission between the engine and the drive wheel and to immediately establish it.

Further, in the present embodiment, the low pressure control is a fixed pressure control for controlling the hydraulic pressure of the hydraulic servo to a target fixed pressure. Therefore, it is possible to suitably bring the frictional engagement element into the state immediately before engagement by the relatively simple control.

Further, in the present embodiment, the neutral control unit starts the feedback control of the hydraulic pressure of the hydraulic servo so that the frictional engagement element is brought into the state immediately before engagement, on the basis of the engagement state of the frictional engagement element, after the hydraulic pressure of the hydraulic servo is controlled to the predetermined hydraulic pressure when the restart control of the engine is executed. Therefore, it is possible to prevent a delay in the engagement of the frictional engagement element, for example, when the start request from the driver exists, while it is possible to respond to a change in time lapse.

Further, in the present embodiment, the neutral control unit detects the engagement state of the frictional engagement element on the basis of the detection result of the rotation number difference detecting unit which detects the rotation number difference between the rotation number of the engine and the rotation number of the input shaft, and executes the feedback control. Therefore, it is possible to suitably bring the frictional engagement element into the state immediately before engagement, in response to the change in time lapse.

Further, in the present embodiment, the neutral control unit executes the feedback control on the basis of the rate of change in the rotation number difference which is detected by the rotation number detecting unit. Therefore, it is possible to suitably bring the frictional engagement element into the state immediately before engagement, in response to the change in time lapse.

Further, in the present embodiment, the neutral control unit executes the feedback control so that the rotation number difference detected by the rotation number detecting unit becomes equal to the target rotation number difference. Therefore, it is possible to suitably bring the frictional engagement element into the state immediately before engagement, in correspondence to the change with time.

Further, in the present embodiment, the neutral control unit increases the hydraulic pressure of the hydraulic servo in stages in the case that the change rate of the rotation number difference which is detected by the rotation number difference detecting unit is equal to or less than a predetermined threshold value, and decreases the hydraulic pressure of the hydraulic servo by one stage in the case that the change rate of the rotation number difference which is detected by the rotation number difference detecting unit is equal to or more than a predetermined threshold value, and the learning control unit stores a hydraulic pressure that is one stage below the hydraulic pressure of the hydraulic servo in the case that the change rate of the rotation number difference is equal to or more than the predetermined threshold value. Therefore, a hydraulic pressure that is one stage below the hydraulic pressure that the friction engagement element is engaged, i.e. a hydraulic pressure immediately before engagement of the friction engagement element, can be stored.

Further in the present embodiment, the learning control unit executes a learning control such that the low pressure control unit executes the low pressure control next time on the basis of a hydraulic pressure that is finally stored out of hydraulic pressures that are stored during the feedback control by the neutral control unit. Therefore, a hydraulic pressure that became an optimum value by repeated feedback control can be stored and the low pressure control can be executed on the basis of the optimum hydraulic pressure.

Further in the present embodiment, there is provided a vehicle, including an engine start condition judging unit which judges a condition for starting the engine and an engine starting unit which starts the engine on the basis of a judgement of the engine start condition judging unit, wherein the engine start condition judging unit judges the condition for starting the engine other than a start request, and executes the restart control. Therefore, since the engine start condition judging unit judges the condition for starting the engine other than the start request, and executes the restart control, it is possible to prevent the frictional engagement element from being engaged and to prevent the vehicle from starting without the driver's intention of starting the vehicle in the case that the restart control of the engine based on the condition other than the start request is executed, while it is possible to immediately engage the frictional engagement element when the start request from the driver exists.

Further, in the present embodiment, the low pressure control unit immediately starts the low pressure control on the basis of a judgement of the engine start condition judging unit. Therefore, the low pressure control can be started before the engine is started.

Further, in the present embodiment, the engine starting unit starts the engine a predetermined time after a judgement of the engine start condition judging unit. The engine can be prevented from being started during the low pressure control of the hydraulic pressure of the hydraulic servo. Therefore, in a state that the frictional engagement element is engaged, the engine can be prevented from being started.

Further, in the present embodiment, the engine start condition judging unit judges the condition for starting the engine other than the start request on the basis of the reduction in remaining amount of the battery or the start of the air conditioner. Therefore, it is possible to prevent the frictional engagement element from being engaged and to prevent the vehicle from starting without the intention of the driver, for example, even when the engine start without the intention of the driver is executed on the basis of the reduction in remaining amount of the battery or the start of the air conditioner.

Further, in the present embodiment, the low pressure control unit continues the low pressure control until the start request is detected by the start request detecting unit. Therefore, it is possible to immediately engage the frictional engagement element when the start request from the driver is issued, and it is possible to immediately start the vehicle.

Further, in the present embodiment, the start request detecting unit detects the start request on the basis of the operation state of the brake pedal or the throttle opening degree. Therefore, it is possible to immediately engage the frictional engagement element when the start request from the driver is issued, on the basis of the operation state of the brake pedal or the throttle opening degree, and it is possible to immediately start the vehicle.

Further, in the present embodiment, the low pressure control controls the hydraulic pressure so as to close up a gap interposed between the plurality of friction plates and the piston. Therefore, the friction engagement element can be brought into the state immediately before engagement. In addition it can be immediately engaged by raising the hydraulic pressure of the hydraulic servo.

Further, in the present embodiment, there is provided a vehicle, including an electrically driven oil pump which freely supplies the hydraulic pressure to the hydraulic servo and an electrically driven oil pump control unit which drives and controls the electrically driven oil pump on the basis of one of the automatic stop control of the engine and the restart control of the engine during the automatic stop control of the engine. Therefore, the hydraulic pressure can always be supplied to the hydraulic servo regardless of the engine state.

Further, in the present embodiment, the frictional engagement element is in an engaged state during the automatic stop control of the engine. However, because the low pressure control unit brings the frictional engagement element into the state immediately before engagement on the basis of the restart control of the engine, it is possible to prevent the vehicle from starting without the intention of the driver.

Further, in the present embodiment, the start request detecting unit which detects the start request is provided, and the neutral control unit cancels the feedback control on the basis of the detection of the start request detecting unit, and increases a hydraulic pressure of the hydraulic servo so as to engage the frictional engagement element. Therefore, it is possible to immediately engage the frictional engagement element when the start request from the driver is issued, and it is possible to immediately start the vehicle.

Further, in the invention, the neutral control unit sets the start hydraulic pressure for the feedback control to the fixed hydraulic pressure. Therefore, it is possible to bring the frictional engagement element into the state immediately before engagement in a relatively short time with a high accuracy.

Further, in the present embodiment, the engine state detecting unit which detects the state of the engine is provided, and the neutral control unit starts the feedback control when the engine state detecting unit detects that the start of the engine by the engine starting unit is completed. Therefore, it is possible to execute the feedback control on the basis of the rotation number difference between the rotation number of the engine in which the start is completed, and the rotation number of the input shaft.

Further, in the invention, the engine state detecting unit which detects the state of the engine is provided, and the neutral control unit starts the feedback control when the engine state detecting unit detects that the rotation number of the engine is equal to or more than the predetermined rotation number. Therefore, it is possible to execute the feedback control on the basis of the rotation number difference between the rotation number of the rotating engine and the rotation number of the input shaft.

Further, in the invention, the control apparatus is provided with the mechanical oil pump which is operated according to the engine and freely supplies the hydraulic pressure of the hydraulic servo, the electrically driven oil pump which freely supplies the hydraulic pressure of the hydraulic servo, and the electrically driven oil pump control unit which drives and controls the electrically driven oil pump during the automatic stop control of the engine on the basis of the automatic stop control of the engine or the restart control of the engine, and the hydraulic pressure of the hydraulic servo is constantly supplied by the mechanical oil pump or the electrically driven oil pump. Therefore, it is possible to constantly supply the hydraulic pressure to the hydraulic servo irrespective of the start state or the stop state of the engine.

The invention is not limited to the embodiments as disclosed above, but various modifications can be permitted based on the spirit of the inventions, and these modifications shall not be excluded from the scope of the invention.

The disclosure of Japanese Patent Application Nos. 2001-265152, 2002-265153 and 2001-265154, all filed on Aug. 31, 2001, including specifications, drawings and claims are incorporated by reference in their entirety.

What is claimed is:

1. A control apparatus for a vehicle which executes an automatic stop control of an engine on the basis of a stop condition, and executes a restart control of the engine on the basis of a start condition, comprising:

an engagement element which freely interrupts and establishes power transmission between an output of the engine and a drive wheel;

a hydraulic servo which freely operates an engagement state of the engagement element; and a control unit which executes a low pressure control for bringing a hydraulic pressure of the hydraulic servo into a state immediately before the engagement element is engaged at a time when the restart control of the engine is executed while the vehicle is being stopped and the automatic stop control of the engine is being executed.

2. The control apparatus as claimed in claim 1, further comprising:

an automatic transmission which is interposed between an input shaft to which an output of the engine is input and the drive wheel, has a transmission unit which can execute a changeover of a transmission path using a fluid transmission device and a plurality of engagement elements, and changes speed of rotation of the input shaft on the basis of engagement and disengagement of the plurality of engagement elements so as to output the rotation of the input shaft to the drive wheel, wherein the engagement element is an input clutch which is engaged with at least a forward first speed stage out of the plurality of engagement elements so as to transmit the rotation of the input shaft.

3. The control apparatus as claimed in claim 1, wherein the low pressure control is a fixed pressure control for controlling the hydraulic pressure of the hydraulic servo to a fixed target pressure.

4. The control apparatus as claimed in claim 3, wherein the control unit executes a feedback control for bringing a hydraulic pressure of the hydraulic servo into a state immediately before the engagement element is engaged on the basis of the engagement state of the engagement element, and starts the feedback control after the hydraulic pressure of the hydraulic servo is controlled to the fixed target pressure when the restart control of the engine is executed.

5. The control apparatus as claimed in claim 4, wherein the control unit stores the hydraulic pressure when the feedback control is executed, and executes learning so that the control unit can execute the low pressure control on the basis of the stored hydraulic pressure.

6. The control apparatus as claimed in claim 4, further comprising a detecting unit which detects a difference in rotation number between a rotation number of the engine and a rotation number of the input shaft, wherein the control unit detects an engagement state of the engagement element on the basis of a detection result of the detecting unit, and executes the feedback control.

7. The control apparatus as claimed in claim 6, wherein the control unit executes the feedback control on the basis of a rate of change in the rotation number difference which is detected by the detecting unit.

8. The control apparatus as claimed in claim 6, wherein the control unit executes the feedback control so that the rotation number difference detected by the detecting unit becomes equal to a target rotation number difference.

9. The control apparatus as claimed in claim 6, wherein the control unit increases the hydraulic pressure of the hydraulic servo in stages in the case that a change rate of the rotation number difference which is detected by the detecting unit is equal to or less than a predetermined threshold value, and decreases the hydraulic pressure of the hydraulic servo by one stage in the case that the change rate of the rotation number difference which is detected by the detecting unit is equal to or more than a predetermined threshold value, and stores a hydraulic pressure that is one stage below the hydraulic pressure of the hydraulic servo in the case that the change rate of the rotation number difference is equal to or more than the predetermined threshold value.

10. The control apparatus as claimed in claim 5, wherein the control unit executes a learning control such that the low pressure control is executed next time on the basis of a hydraulic pressure that is finally stored out of hydraulic pressures that are stored during the execution of the feedback control.

11. The control apparatus as claimed in claim 1, comprising:
a judging unit which judges a condition for starting the engine; and
a starting unit which starts the engine on the basis of a judgement of the judging unit, wherein the judging unit judges the condition for starting the engine other than a start request, and operates the control unit.

12. The control apparatus as claimed in claim 11, wherein the control unit immediately starts the low pressure control on the basis of a judgment of the judging unit.

13. The control apparatus as claimed in claim 11, wherein the starting unit starts the engine a predetermined time after a judgement of the judging unit.

14. The control apparatus as claimed in claim 11, wherein the judging unit judges the condition for starting the engine, other than the start request, on the basis of one of a reduction in a remaining amount of a battery and a start of an air conditioner.

15. The control apparatus as claimed in claim 11, further comprising:
a detecting unit which detects the start request, wherein the control unit continues the low pressure control until the start request is detected by the detecting unit.

16. The control apparatus as claimed in claim 15, wherein the detecting unit detects the start request on the basis of one of an operation state of a brake pedal and a throttle opening degree.

17. The control apparatus as claimed in claim 1, wherein the engagement element has a plurality of friction plates, the hydraulic servo has a piston which freely presses the plurality of friction plates on the basis of the hydraulic pressure, and the control unit controls the hydraulic pressure so as to close up a gap interposed between the plurality of friction plates and the piston.

18. The control apparatus as claimed in claim 1, comprising:
a pump which freely supplies the hydraulic pressure to the hydraulic servo, wherein the control unit drives and controls the pump on the basis of one of the automatic stop control of the engine and the restart control of the engine during the automatic stop control of the engine.

19. The control apparatus as claimed in claim 18, wherein the engagement element is in an engaged state during the automatic stop control of the engine.

20. The control apparatus as claimed in claim 4, further comprising:
a detecting unit which detects the start request, wherein the control unit cancels the feedback control on the basis of detection of the detecting unit, and increases the hydraulic pressure of the hydraulic servo so as to engage the engagement element.

21. The control apparatus as claimed in claim 4, wherein the control unit sets a start hydraulic pressure for the feedback control to the fixed hydraulic pressure.

22. The control apparatus as claimed in claim 6, further comprising an engine state detecting unit which detects a state of the engine, wherein the control unit starts the feedback control when the engine state detecting unit detects that the start of the engine by an engine starting unit is completed.

23. The control apparatus as claimed in claim 6, further comprising an engine state detecting unit which detects a state of the engine, wherein the control unit starts the feedback control when the engine state detecting unit detects that a rotation number of the engine is equal to or more than a predetermined rotation number.

24. The control apparatus as claimed in claim 4, comprising:
a first pump which is driven according to the engine and freely supplies the hydraulic pressure of the hydraulic servo;
a second pump which freely supplies the hydraulic pressure of the hydraulic servo, wherein the control unit drives and controls the second pump during the automatic stop control of the engine on the basis of one of the automatic stop control of the engine and the restart control of the engine, and the hydraulic pressure of the hydraulic servo is constantly supplied by one of the first pump and the second pump.

25. The control apparatus as claimed in claim 24, wherein the first pump is a mechanical oil pump and the second pump is an electrically driven oil pump.

26. A method of executing an automatic stop control of an engine on the basis of a stop condition, executing a restart control of the engine on the basis of a start condition and controlling an engagement element which freely interrupts and establishes power transmission between an output of the engine and a drive wheel and a hydraulic servo which freely operates an engagement state of the engagement element, comprising:

bringing a hydraulic pressure of the hydraulic servo into a state immediately before the engagement element is engaged, with a low pressure control, at a time when the restart control of the engine is executed while the vehicle is being stopped and the automatic stop control of the engine is being executed.

27. The method of claim 26, wherein the hydraulic pressure of the hydraulic servo is controlled to a fixed target pressure with a fixed pressure control.

28. The method of claim 27, comprising:

bringing a hydraulic pressure of the hydraulic servo into a state immediately before the engagement element is engaged, on the basis of the engagement state of the engagement element; and starting a feedback control after the hydraulic pressure of the hydraulic servo is controlled to the fixed target pressure when the restart control of the engine is executed.

29. The method of claim 28, comprising:

storing the hydraulic pressure when the feedback control is executed; and learning so that the low pressure control can be executed on the basis of the stored hydraulic pressure.

30. The method of claim 28, comprising:

detecting a difference in rotation number between a rotation number of the engine and a rotation number of an input shaft;

detecting an engagement state of the engagement element on the basis of a detection result; and executing the feedback control based on a detected engagement state.

31. The method of claim 30, wherein the feedback control is executed on the basis of a rate of change in the rotation number difference.

32. The method of claim 30, wherein the feedback control is executed so that the rotation number difference becomes equal to a target rotation number difference.

33. The method of claim 30, comprising:

increasing the hydraulic pressure of the hydraulic servo in stages in the case that a change rate of the rotation number difference is equal to or less than a predetermined threshold value;

decreasing the hydraulic pressure of the hydraulic servo by one stage in the case that the change rate of the rotation number difference which is detected by the detecting unit is equal to or more than a predetermined threshold value; and storing a hydraulic pressure that is one stage below the hydraulic pressure of the hydraulic servo in the case that the change rate of the rotation number difference is equal to or more than the predetermined threshold value.

34. The method of claim 29, wherein a learning control is executed such that the low pressure control is executed next time on the basis of a hydraulic pressure that is finally stored out of hydraulic pressures that are stored during the execution of the feedback control.

35. The method of claim 26, comprising:

judging a condition for starting the engine other than a start request; and starting the engine on the basis of a judgment.

36. The method of claim 35, wherein the low pressure control is immediately started on the basis of the judgment.

37. The method of claim 35, wherein the engine is started at a predetermined time after a judgment.

38. The method of claim 35, wherein the condition for starting the engine is judged based on one of a reduction in a remaining amount of a battery and a start of an air conditioner.

39. The method of claim 35, wherein the low pressure control is continued until the start request is detected by the start request detecting unit.

40. The method of claim 39, wherein the start request is detected on the basis of one of an operation state of a brake pedal and a throttle opening degree.

41. The method of claim 26, wherein the engagement element has a plurality of friction plates, the hydraulic servo has a piston which freely presses the plurality of friction plates on the basis of the hydraulic pressure, comprising:

controlling the hydraulic pressure so as to close up a gap interposed between the plurality of friction plates and the piston.

42. The method of claim 26, comprising:

supplying the hydraulic pressure freely with a pump to the hydraulic servo;

driving and controlling the pump on the basis of one of the automatic stop control of the engine and the restart control of the engine during the automatic stop control of the engine.

43. The method of claim 42, wherein the engagement element is in an engaged state during the automatic stop control of the engine.

44. The method of claim 28, comprising:

detecting the start request;

canceling the feedback control when the start request is detected; and increasing the hydraulic pressure of the hydraulic servo so as to engage the engagement element.

45. The method of claim 28, wherein a start hydraulic pressure for the feedback control is set to the predetermined hydraulic pressure.

46. The method of claim 30, wherein the feedback control is started when the start of the engine by an engine starting unit is completed.

47. The method of claim 30, wherein the feedback control is started when a rotation number of the engine is equal to or more than a predetermined rotation number.

48. The method of claim 30, wherein a first pump is driven according to the engine and freely supplies the hydraulic pressure of the hydraulic servo and a second pump a freely supplies the hydraulic pressure of the hydraulic servo, comprising:

driving and controlling the second pump during the automatic stop control of the engine on the basis of one of the automatic stop control of the engine and the restart control of the engine, wherein the hydraulic pressure of the hydraulic servo is constantly supplied by one of the first pump and the second pump.

* * * * *